US010491932B2

(12) United States Patent
Christie et al.

(10) Patent No.: US 10,491,932 B2
(45) Date of Patent: *Nov. 26, 2019

(54) AGNOSTIC MEDIA DELIVERY SYSTEM

(71) Applicant: Apple Inc., Cupertino, CA (US)

(72) Inventors: Gregory N. Christie, San Jose, CA (US); Alessandro Sabatelli, San Francisco, CA (US); William M. Bachman, San Jose, CA (US); Imran Chaudhri, San Francisco, CA (US); Jeffrey Robbin, Los Altos, CA (US); Jim Young, Livermore, CA (US); Joe Howard, San Jose, CA (US); Marcel Van Os, San Francisco, CA (US); Patrick L. Coffman, San Francisco, CA (US); Stephen O. Lemay, Palo Alto, CA (US); Jeffrey Ma, Redwood City, CA (US); Lynne Kress, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/010,280

(22) Filed: Jun. 15, 2018

(65) Prior Publication Data

US 2018/0295403 A1 Oct. 11, 2018

Related U.S. Application Data

(63) Continuation of application No. 15/414,493, filed on Jan. 24, 2017, now Pat. No. 10,021,440, which is a (Continued)

(51) Int. Cl.
H04N 21/232 (2011.01)
H04N 21/236 (2011.01)
(Continued)

(52) U.S. Cl.
CPC ....... *H04N 21/2541* (2013.01); *H04N 21/232* (2013.01); *H04N 21/25875* (2013.01);
(Continued)

(58) Field of Classification Search
CPC .......... H04N 21/2225; H04N 21/2365; H04N 21/2396
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000-163031 A 6/2000
JP 2002-342033 A 11/2002

OTHER PUBLICATIONS

Bohn, D. (Jan. 6, 2014). "Rebooting webOS: how LG rethought the smart TV," located at: http://www.theverge.com/2014/1/6/5279220/rebooting-webos-how-lg-rethought-the-smart-tv, last visited: Feb. 24, 2014, seven pages.
(Continued)

Primary Examiner — Dominic D Saltarelli
(74) Attorney, Agent, or Firm — Kubota & Basol LLP

(57) ABSTRACT

Systems and methods for a media content delivery service. A media content provider includes a data store for storing and serving media content to subscribers. The media content provider continually records and or otherwise stores video and audio content from around the world. Stored content will generally correspond to a large number of other media content providers, such as cable television operators, Internet based media content providers, television networks, and so on. Subscribers to the media provider interact with the media content provider via hardware and/or software
(Continued)

mechanisms either provided by the media content provider or conforming to specifications of the media content provider. Based on these subscriber's subscriptions to the other content providers, the subscribers will have viewing, listening, or application execution privileges for content maintained in the data store. Content of a subscriber corresponding to multiple video content providers is maintained and served by a single provider.

27 Claims, 25 Drawing Sheets

Related U.S. Application Data continuation of application No. 14/242,575, filed on Apr. 1, 2014, now Pat. No. 9,591,339, which is a continuation of application No. 14/088,138, filed on Nov. 22, 2013, now abandoned.

(60) Provisional application No. 61/799,545, filed on Mar. 15, 2013, provisional application No. 61/730,501, filed on Nov. 27, 2012.

(51) Int. Cl.

| | | |
|---|---|---|
| *H04N 21/254* | (2011.01) | |
| *H04N 21/258* | (2011.01) | |
| *H04N 21/266* | (2011.01) | |
| *H04N 21/462* | (2011.01) | |
| *H04N 21/466* | (2011.01) | |
| *H04N 21/472* | (2011.01) | |
| *H04N 21/482* | (2011.01) | |
| *H04N 21/2665* | (2011.01) | |
| *H04N 21/4415* | (2011.01) | |
| *H04N 21/45* | (2011.01) | |
| *H04N 21/4627* | (2011.01) | |
| *H04N 21/845* | (2011.01) | |

(52) U.S. Cl.
CPC ... *H04N 21/25891* (2013.01); *H04N 21/2665* (2013.01); *H04N 21/4415* (2013.01); *H04N 21/4532* (2013.01); *H04N 21/4622* (2013.01); *H04N 21/4627* (2013.01); *H04N 21/4668* (2013.01); *H04N 21/47202* (2013.01); *H04N 21/4821* (2013.01); *H04N 21/4826* (2013.01); *H04N 21/8456* (2013.01)

(58) Field of Classification Search
USPC ........................................ 725/25–31, 86–104
See application file for complete search history.

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,386,588 B1 | 2/2013 | Cooley |
| 8,479,122 B2 | 7/2013 | Hotelling et al. |
| 8,613,015 B2 | 12/2013 | Gordon et al. |
| 9,219,634 B1 | 12/2015 | Morse et al. |
| 2003/0093790 A1 | 5/2003 | Logan et al. |
| 2006/0197753 A1 | 9/2006 | Hotelling |
| 2014/0250465 A1 | 9/2014 | Mulholland et al. |

OTHER PUBLICATIONS

Grey, M. (Jun. 11, 2013). "Comcast's new X2 platform moves your DVR recordings from the box to the cloud," located at: http://www.engadget.com/2013/06/11/comcast-x2-platform/ last visited: Feb. 24, 2014, fifteen pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Mar. 21, 2016, for U.S. Appl. No. 14/242,575, filed Apr. 1, 2014, 11 pages.

Non-Final Office Action dated Oct. 6, 2017, for U.S. Appl. No. 15/414,493, filed Jan. 24, 2017, 14 pages.

Notice of Allowance dated Oct. 27, 2016, for U.S. Appl. No. 14/242,575, filed Apr. 1, 2014, 11 pages.

Notice of Allowance dated Nov. 16, 2016, for U.S. Appl. No. 14/242,575, filed Apr. 1, 2014, seven pages.

Notice of Allowance (corrected) dated Dec. 15, 2016, for U.S. Appl. No. 14/242,575, filed Apr. 1, 2014, seven pages.

Notice of Allowance dated Mar. 14, 2018, for U.S. Appl. No. 15/414,493, filed Jan. 24, 2017, seven pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

AGNOSTIC MEDIA DELIVERY SYSTEM

CROSS-REFERENCE TO RELATED APPLICATIONS

This application is a continuation of U.S. patent application Ser. No. 15/414,493 (now U.S. Publication No. 2017/0134778), filed Jan. 24, 2017, which is a continuation of U.S. patent application Ser. No. 14/242,575 (now U.S. Pat. No. 9,591,339 issued on Mar. 7, 2017), filed Apr. 1, 2014, which is a continuation of U.S. patent application Ser. No. 14/088,138, filed Nov. 22, 2013, which claims benefit of U.S. Provisional Patent Application No. 61/799,545, filed Mar. 15, 2013 and U.S. Provisional Patent Application No. 61/730,501, filed Nov. 27, 2012, the entire disclosures of which are incorporated herein by reference for all purposes.

FIELD OF THE INVENTION

This invention relates to multimedia systems, and more particularly, to delivery of media content.

DESCRIPTION OF THE RELEVANT ART

For many years, broadcast television was the sole provider of video content to viewer's homes across the globe. As time has passed, and particularly with the advent of the Internet, numerous other sources of video content have arisen. In addition to broadcast television, cable television and satellite based television providers have begun providing access to video on demand and other audio and video content. In addition, special purpose set-top boxes, such as that provided by Roku®, provided a gateway for viewer's to access other sources of video content not provided by their television service provider. With such boxes, viewers were able to connect to these other content providers in order to obtain desired video content. At present, there are countless video providers in the marketplace. In addition, music and other audio content is available through various communication channels. Many are subscription based services, and some provide free content. While the explosion of video content providers in the marketplace may seem a boon for viewer's, the large number of choices and providers complicates the viewing experience.

In view of the above, improved media content delivery systems, methods and mechanisms are desired.

SUMMARY OF EMBODIMENTS

Systems and methods for a media content delivery service are contemplated.

A media content delivery service is contemplated that includes a data store for storing and serving video content to subscribers. Such a data store may comprise one or more data stores, distributed storage, peer-to-peer based storage, cloud based storage or otherwise. In various embodiments, the media content provider is configured to continually record and or otherwise acquire media content from around the world for storage. Video and audio content stored in the data store will generally correspond to a large number of other content providers, such as cable television operators, Internet based content providers, television networks, and so on. The media content provider also maintains metadata regarding the video content in the data store. In addition to including information concerning the media content itself—such as format, duration, compression particulars, and so on, the metadata also includes information that associates the video content with the other video content providers. For example, a stored episode of a series shown on the HBO network will be identifiable as corresponding to the HBO network.

Subscribers to the media delivery provider interact with the media delivery provider via hardware and/or software mechanisms either provided by the media delivery provider or conforming to specifications of the media delivery provider. In this manner, the viewing and listening (media consumption) experience for subscriber's may be relatively uniform. Based on these subscriber's subscriptions to the other video content providers, the subscribers will have viewing privileges for content maintained in the data store. In this manner, video content of a subscriber corresponding to multiple video content providers is maintained and served by a single provider.

Figure 1:
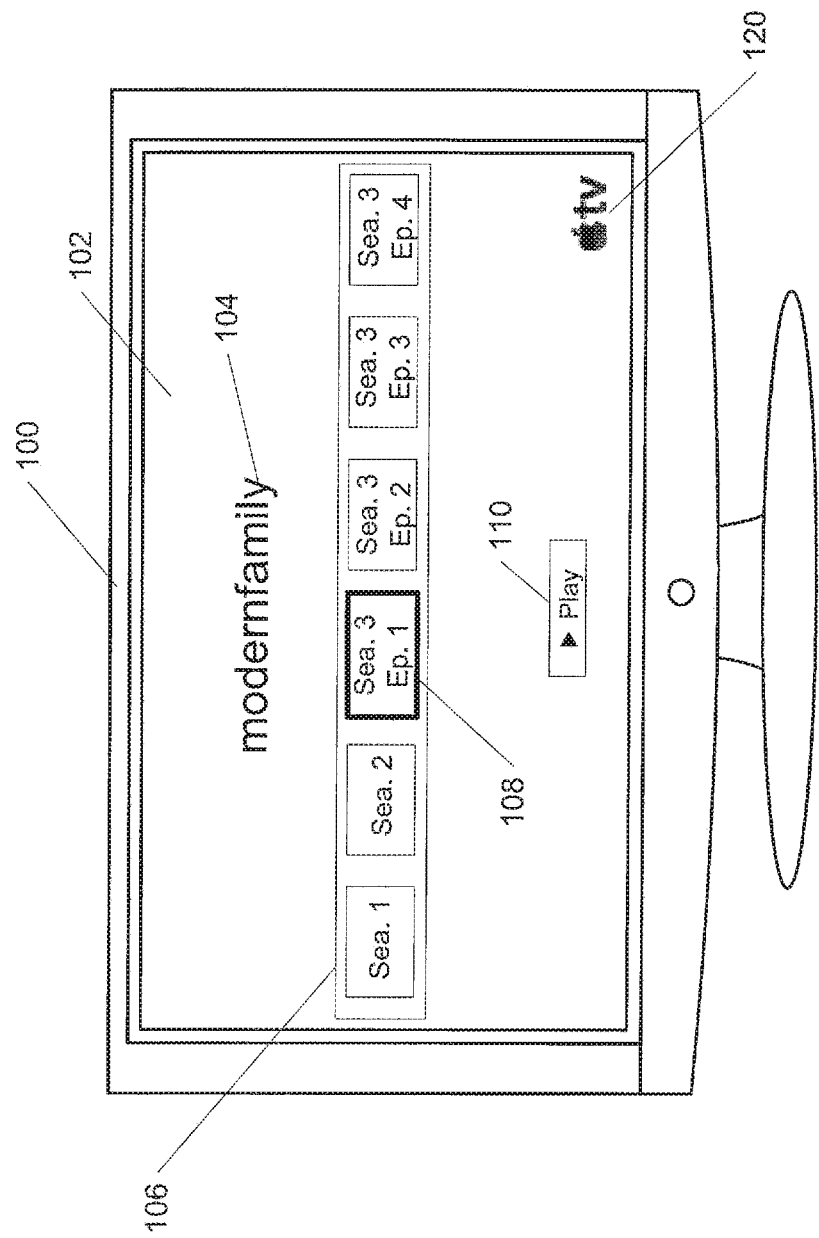
FIG. 1 depicts one embodiment of a video display.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, one embodiment of a television 100 and television display 102 is shown. In the example shown, the television display 102 is displaying video content related to a television show. In particular, the title 104 of a television show is depicted along with an episode bar 106 and play icon 110. In the embodiment shown, the content depicted by the display 102 is provided according to a subscription a viewer has with a television subscription service. In one embodiment, this television subscription service is an Apple TV® service indicated by the icon 120. In various embodiments, the title 104, bar 106, and icon 110 may be generated as an overlay on top of another image, such as a still picture, video content, animation, or otherwise. Such overlays may be produced by a set-top box, a program executing on, or logic incorporated into circuitry incorporated into the television 100 itself, or by a provider of video content (e.g., the Apple TV service). In other embodiments, rather than an overlay, the title 104, bar 106, and/or 110 may be integrally generated as part of an image or video displayed on the display portion 102 of the television. As used herein, "overlay" is intended to include not only the generation of overlays on top of other content, by the content that is integrally generated as part of the video content as well.

As shown in the example, bar 106 includes six images which correspond to subject matter related to the show titled 104 above. As shown, subject matter corresponding to three seasons of the show ("modernfamily") are depicted. In particular, images corresponding to season 1 (Sea. 1), season 2 (Sea. 2), and season 3 (Sea. 3) are shown. For season 3, separate images are shown to correspond to particular episodes of season 3; namely, episodes 1-4 (Ep. 1-Ep. 4). In various embodiments, the images depicted within the bar 106 may be still images or video corresponding to the related season or episode, movie, or other media content.

Also shown in FIG. 1, one of the particular images 108 is indicated to have "focus". As understood by those skilled in the art, "focus" generally refers to the selection of a graphical element on a display in order to display information related to the selected item, prepare the item for further selection in order to further traverse a graphical user interface, and so on. In this example, focus is illustrated by the use of a broader outline on image 108 than is used for the other images within bar 106. Numerous other alternative ways for indicating focus are known in the art, such as the use of different lighting, colors, animations, etc. All such alternatives are contemplated. Focus in this case may be used to identify a particular image within bar 106 which is intended as a target when the play icon 110 is selected by a user. In this manner, selecting play 110 while image 108 is selected (i.e., has focus) may result in episode 1 of season 3 of the modernfamily television series being played on the display 102.

While FIG. 1 depicts seasons and episodes of a television series available for viewing, what is not shown to the television viewer in this example is that the content corresponding to the images in bar 106 has been aggregated from multiple sources corresponding to multiple subscriptions. As used herein, subscriptions to these multiple services may be referred to as secondary subscriptions, while a subscription to the service corresponding to the display 102 (e.g., the Apple TV service) may be referred to as the primary subscription. In various embodiments, the primary subscription may be to Apple TV (or iTunes or a similar service) in which case Apple TV may be referred to as the "primary provider", and the other multiple service providers may be referred to as "secondary providers". It is noted that in some cases, a secondary provider may not provide all of the content to which it provides access. In some embodiments, a subscription with a secondary provider simply gives a viewer the right to access the data from a different provider. Various such alternatives are possible and are contemplated. In contrast to the scenario depicted in FIG. 1, in a typical scenario a viewer may have a subscription to a service such as the NETFLIX® service which provides television, movie, and other video content. When displaying available content for viewing, the NETFLIX service displays content available from NETFLIX. Alternatively, a service such as the TIVO® service may depict content available from multiple sources corresponding to multiple subscriptions. However, when accessing such content, the viewer accesses a particular service provider in order to obtain the desired content assuming the viewer has a subscription. In such a case, the TIVO service simply points the viewer to a service which provides content. The viewer then connects to that service to obtain content. In contrast to the above, not only does bar 106 in FIG. 1 identify content corresponding to multiple providers which may require multiple secondary subscriptions, all of the corresponding content has been aggregated by the provider of the service that corresponds to the primary subscription (e.g., Apple TV).

Figure 2:
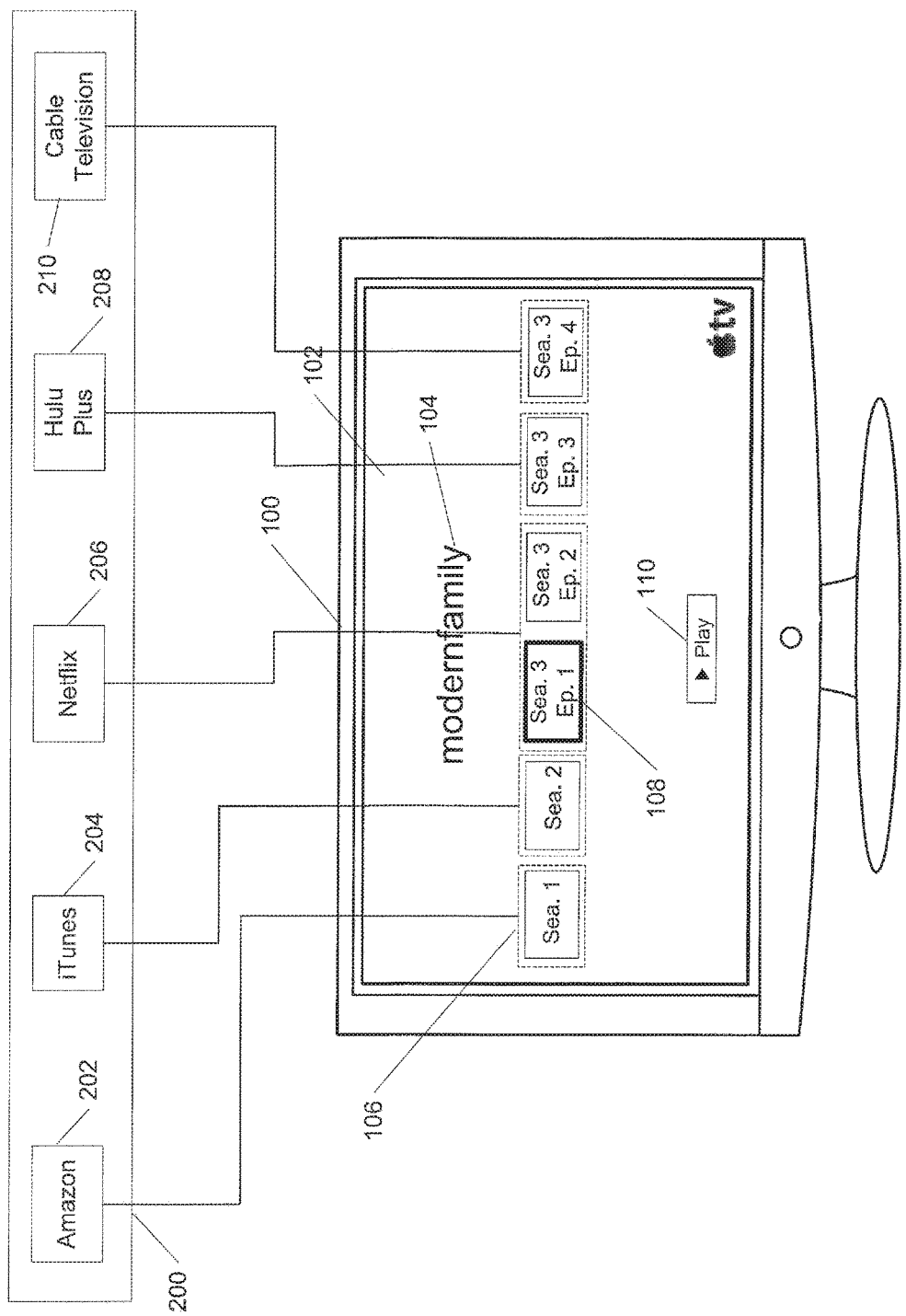
FIG. 2 depicts one embodiment of a video display and secondary sources.

For example, FIG. 2 illustrates the television 100 and display 102 of FIG. 1 with like items having identical reference numerals. FIG. 2 illustrates that the content identified within bar 106 corresponds to different subscription based services 200. For example, season 1 (Sea. 1) is available from the Amazon® service 202, season 2 (Sea. 2) is available from the Apple iTunes® service 204, episodes 1 and 2 of season 3 are available from the Netflix® service 206, episode 3 of season 3 is available from the Hulu Plus® service 208, and episode 4 of season 4 is available from a cable television service 210. In the example shown, a viewer of the display 102 has a subscription to a service provided by the source of the display 102. For example, the viewer may have a subscription to an Apple TV® (the primary subscription). In various embodiments, the Apple TV service has recorded or otherwise obtained and aggregated content corresponding to all of the sources/providers shown in block 200. Such content may have been obtained directly from the providers themselves, or otherwise. In such an embodiment, whether the viewer selects to view episode 3 or episode 4 of season 3 (each of which corresponds to a different provider and subscription), or any of the other content shown in block 106, the content will be provided by the Apple TV service.

Figure 3:
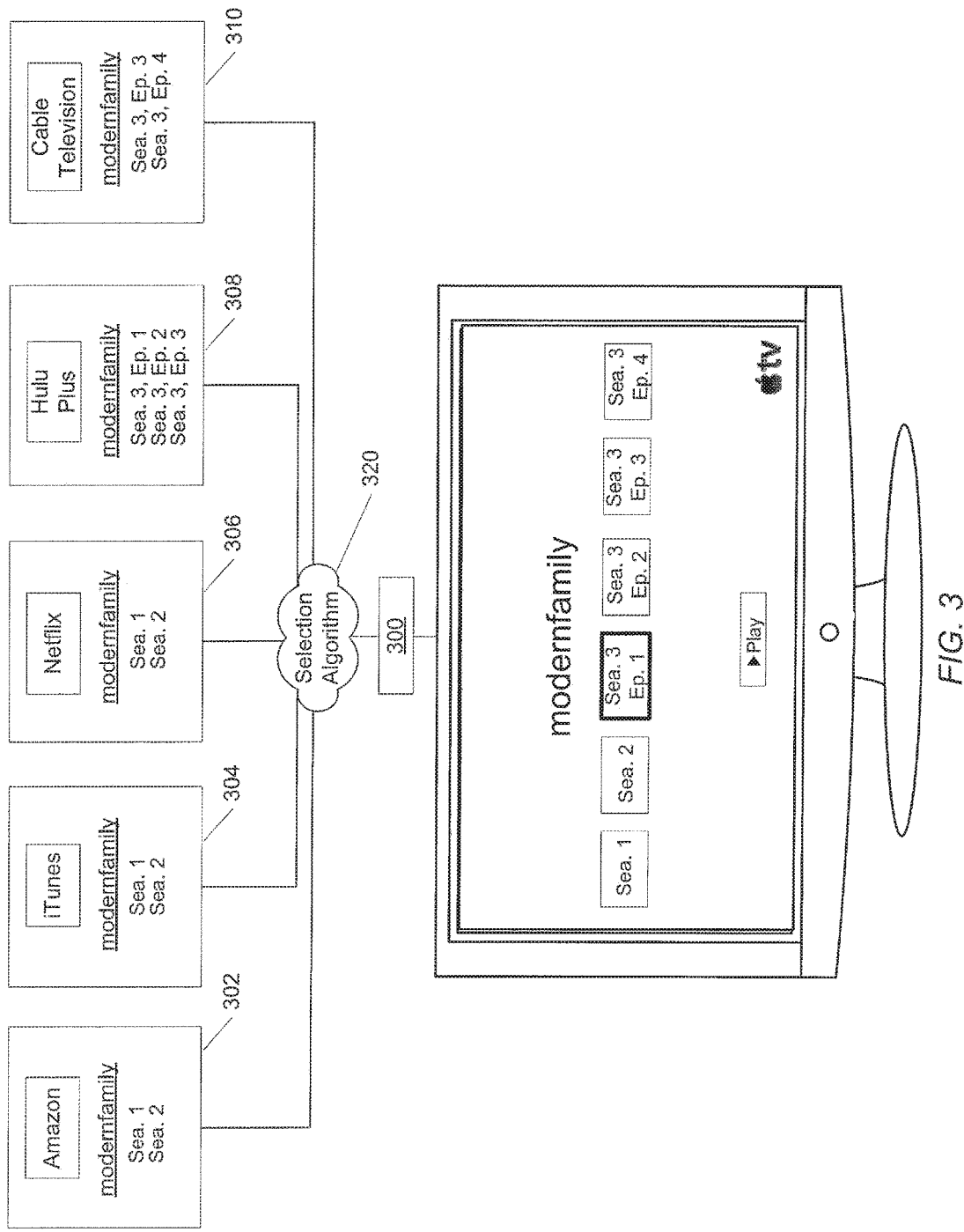
FIG. 3 depicts one embodiment of a video display and secondary sources.

FIG. 3 illustrates one embodiment in which a selection algorithm is used for determining what content is shown as available. Such an algorithm(s) may also be used to select particular content for display when multiple options are available. For example, as shown in FIG. 3, each of the services/providers (302, 304, 306, 308, 310) depict relevant content available corresponding to the modernfamily television series. As can be seen, there is significant duplication among the services in available content. As such, a selection algorithm 320 may be used to select from among the available content. Also, shown in this example is a set-top box 300 coupled to the television. In various embodiments, selection algorithm may include hardware and/or software based processes performed at a server(s) (not shown in FIG. 3), in the set-top box or television itself, at a content provider, or any combination thereof. For example, there may be multiple options available for the episode 1, season 3, e.g., episode 1 of season 3 may be available from multiple sources. This particular episode is available from both provider 308 and provider 310. In addition, each of these providers may have this particular episode available in high definition (HD), or standard definition (SD) or both. Other options may be available as well. Given the various options, duplicate versions of content are possible. In some embodiments, all versions may be displayed to a viewer as being available. In other embodiments, it may not be desirable to always show all versions currently available. In such embodiments, determining which version(s) of particular content to display as being available for selection may need to be made. Alternatively, if selecting "play" by the viewer causes the episode to immediately begin playing automatically, then a selection algorithm may be needed to determine which source is used to provide the content. Whichever option is selected, it will have been stored by the primary subscription service and provided by this primary subscription service (e.g., Apple TV) rather than one of the services/providers (302, 204, 306, 308, 310). Further details regarding the above mentioned selection algorithms will be discussed in greater detail below.

Figure 4:
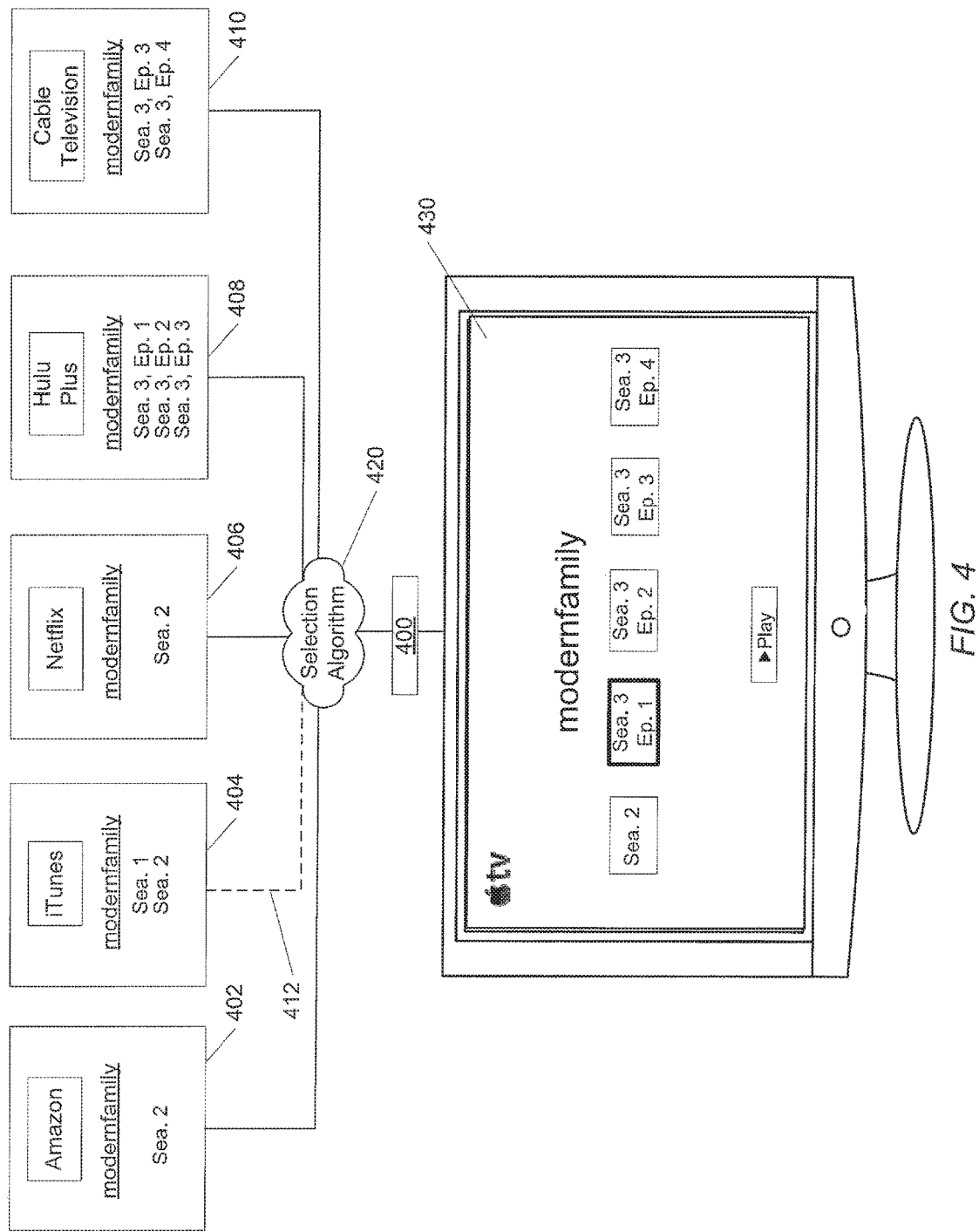
FIG. 4 depicts one embodiment of a video display and secondary sources.

In various embodiments, the content shown as being available in block 106 may also be based upon content that is available for viewing (irrespective of whether the viewer has a current subscription for the content), or content that is available based on the viewer's current subscription(s). The approach used to choose what is shown as being available may be programmable (e.g., based on user settings in a set-top box, based on a service provider's preferences, or otherwise) and may be a combination of the above approaches. FIG. 4 depicts an embodiment in which the content shown as being available is based on whether or not the viewer has a secondary subscription to an available service. In various embodiments, a viewer may be able to view and manage their various primary and secondary subscriptions using interfaces provided by the primary provider on the display. In the example shown in FIG. 4, providers 402-410, selection algorithm 420, set-top box 400 and display 430 are shown. Each of the providers 402-410 are shown coupled to the algorithm 420 by a line. In the embodiment shown, a line coupled from a provider 402-410 to the selection algorithm indicates that the primary subscription based service (Apple TV) provides content corresponding to the given provider (e.g., based on an agreement between the primary subscription service provider and the secondary subscription service provider). A solid line in this case is used to indicate that the viewer has a subscription to the corresponding provider/service and a dashed line indicates the viewer does not have a subscription to the provider/service.

Figure 5:
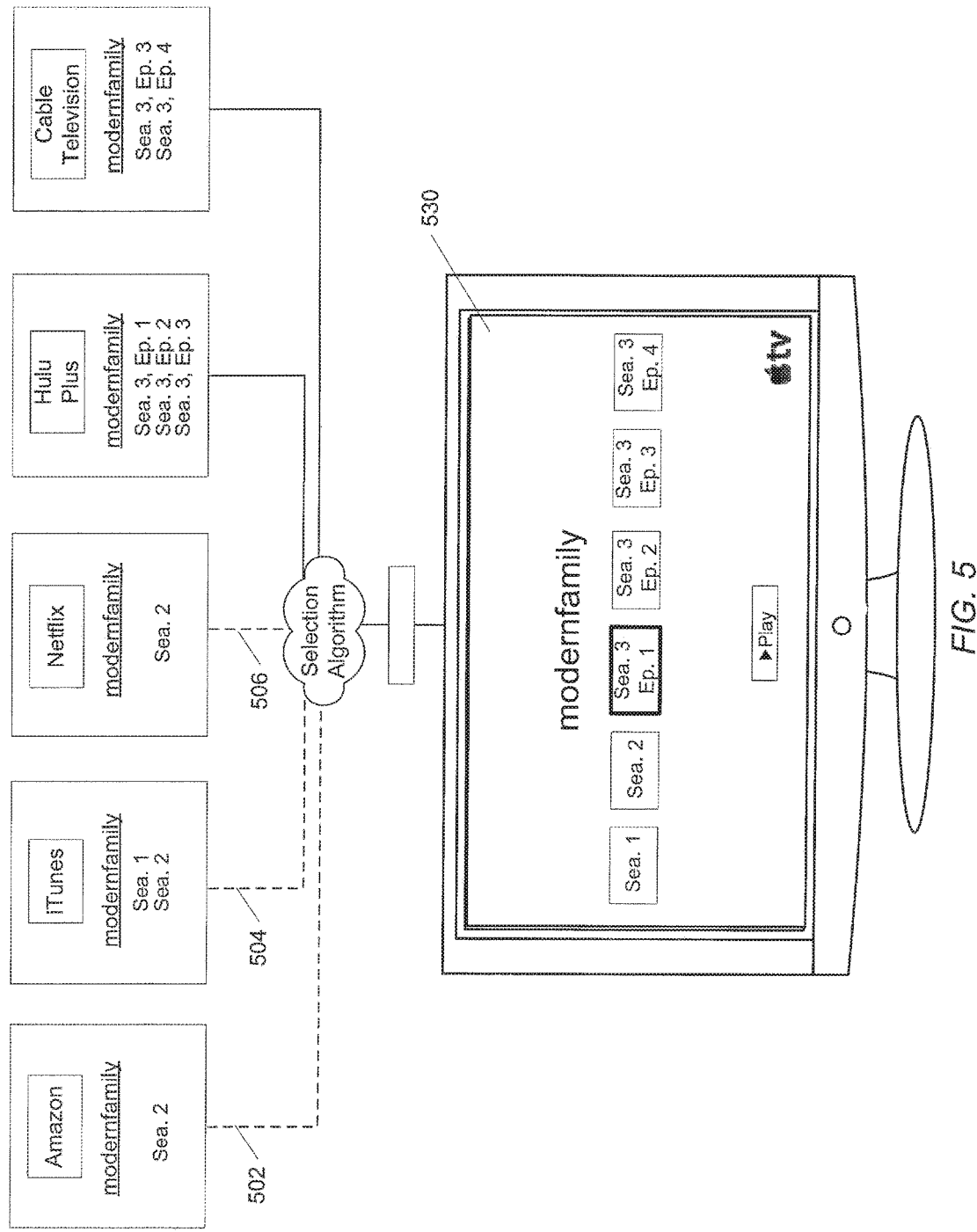
FIG. 5 depicts one embodiment of a video display and secondary sources.

As seen in FIG. 4, the iTunes service is the only provider of season 1 (Sea. 1) of the modernfamily television series. As shown by the dashed line 412, the viewer, which corresponds to the subscription displayed on the display, 430 does not have a currently valid subscription to this service. Consequently, season 1 (Sea. 1) does not show up as being available on the display 430. As an example, a viewer may not want content displayed when a subscription is not available in order to reduce the amount of content displayed. FIG. 5 illustrates the approach wherein content is shown to the viewer as being available irrespective of whether or not the viewer has a (secondary) subscription for the content. In the example of FIG. 5, lines 502, 504, and 506 show the viewer does not have a subscription to the Amazon, iTunes, or Netflix services. Nevertheless, all content is shown as being available to the viewer on the display 530. Having briefly described a television service with primary and secondary subscriptions, and the aggregation of all content by the primary subscription service, we now turn to a discussion of the system in general.

Figure 6:
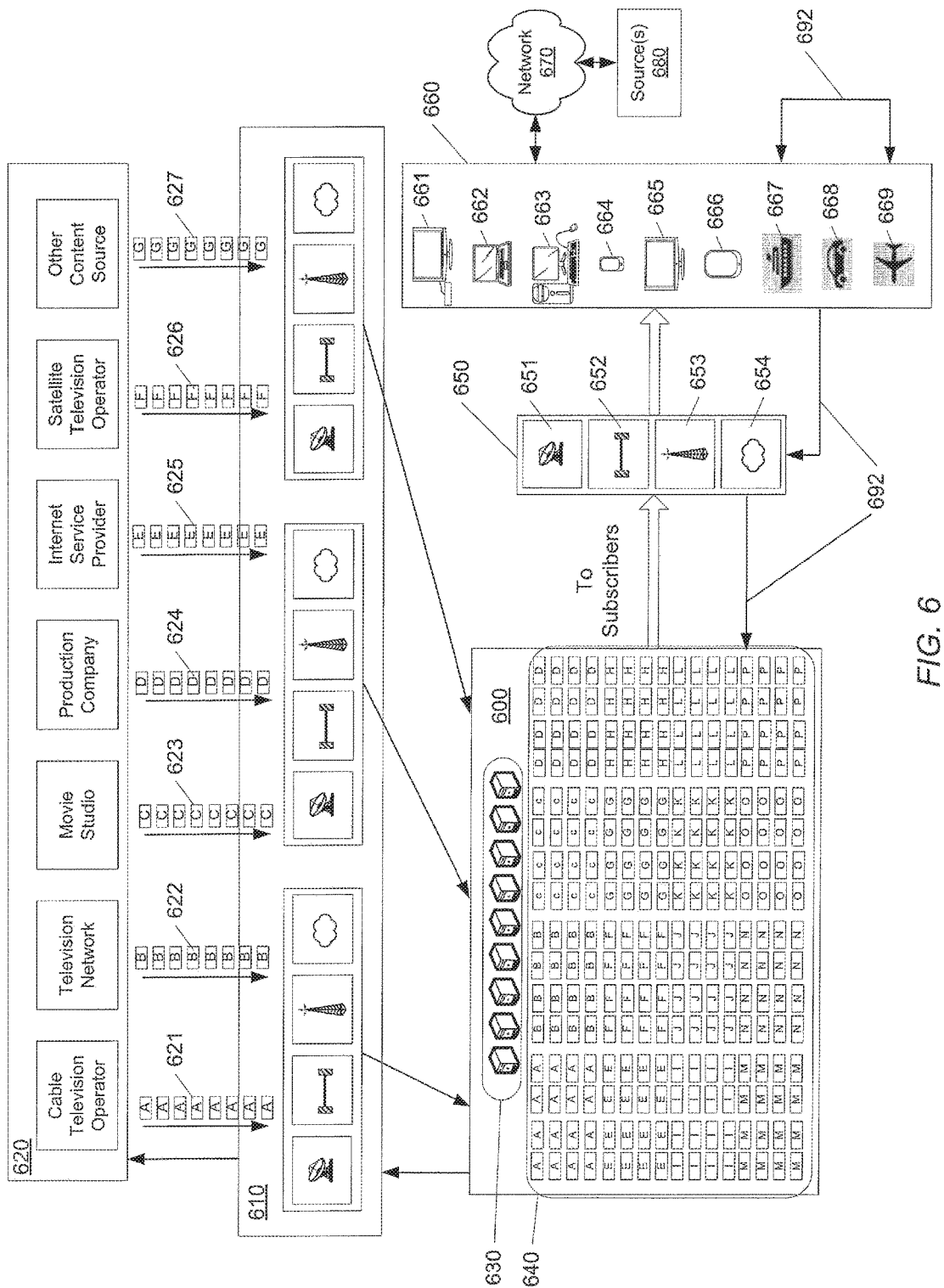
FIG. 6 depicts one embodiment of a portion of a television system.

FIG. 6 illustrates one embodiment of a system corresponding to the above description. In the embodiment shown, a "data store" 600 is shown that includes a large number of servers 630 and a data store 640. In various embodiments, the data store 600 corresponds to a cloud based service whereby content and services are delivered over a network such as the Internet. Also shown are multiple content providers 620 coupled to the data store 600 via multiple communication pathways 610. In various embodiments, providers 620 may include subscription-based providers, which provide paid and/or free content. In various embodiments, the purchase of an application (app) may provide access to particular content. For example, the purchase of a major league baseball app may provide access to content related to major league baseball. In a sense, the purchase of the app effectively serves as a subscription. The application may then be executable (e.g., by the set-top box) to provide an enhanced viewing experience for baseball related viewing. Data store 600 is also shown coupled to convey content to subscribers 660 via multiple pathways 650. Transmission pathways 650 may include satellite-based transmission 651, cable-based systems 652, terrestrial or broadband radio service (BRS) based systems 653, the Internet and/or other networks 654, a combination of these systems, or some other appropriate system of transmission. In the embodiment shown, providers 620 includes cable television operators, television networks, movie studios, production companies, Internet service providers, satellite television operators, and other providers/sources of content. In various embodiments, one or more of the providers 620 corresponds to a subscription-based service whereby subscribers are entitled to gain access to video content.

Also shown in FIG. 6 is the conveyance of content 621-627 by each of the providers 620 via one or more pathways 610 to data store 600. It is noted that while the term data store—singular—is used, in various embodiments the data store 600 is in fact multiple farms that are distributed, as will be discussed shortly. Similar to pathways 650, pathways 610 may include any of a variety of transmission media and may include a variety of transmission protocols. Content 621-627 may generally include video content and related metadata, which describes the content and/or other particular regarding the content. Such metadata can be delivered using protocols or formats such as XML, JSON and the like. Such other particulars may include information regarding licensing related information, subscriber information, pricing information, or otherwise. Appropriate secure or encrypted forms of data transmission can be used to protect commercial and proprietary information related to a provider or personally identifying information related to a user. For ease of illustration, the content 621-627 is shown with a corresponding designation A-G that serves to indicate the content corresponds to a given provider. For example, content 621, which is conveyed by a Cable Television Operator, includes the designation "A". Corresponding data within the data store 600 data store 640 includes the designation "A" as well. In various embodiments, designation "A" for data within data store 640 may serve to indicate that a subscription to the Cable Television Operator includes access to this data. It is noted that such designations for use in relation to data within the data store 640 will form part of the metadata maintained by the data store 600. While content within the data store 640 is shown with a given designation for ease of illustration, in various embodiments particular data in the data farm 600 may be associated with multiple providers 620 and multiple subscriptions. Accordingly, particular content such as an episode of a television show would be associated with multiple providers 620 and metadata maintained by the data store 600 would indicate as much. Therefore, while the illustration of FIG. 6 may depict content as being segregated by provider or subscription (A-P), in various embodiments such segregation or identification is merely logical based on metadata. In various embodiments, data storage reduction techniques such as deduplication and single instance storage will be used for the data store 640.

The previous figures have discussed the television system in terms of conveying content for display on a television. As shown in FIG. 6, the target 660 of video content conveyed by data store 600 may be any of various different types of targets. Exemplary targets 660 shown in FIG. 6 included a set-top box coupled to a television 661, a laptop computer 662, a desktop computer 663, a smart phone, cellular phone, wearable portable device (e.g., a wristwatch type display), other handheld mobile device 664, a television, a tablet computer, a cruise ship for distribution as part of an onboard video system, an automobile (e.g., for display on an integrated video screen), or aircraft for individual distribution to passengers or broader distribution as part of an on-board video system. Other targets capable of displaying video content are possible and are contemplated. Moreover, the content may be movie content that is provided by multiple secondary providers and to which aspects of the description relating to seasons, episodes, channels, that are more relevant to typical television programming may not apply. In addition, in some embodiments, the system and its interface may be used to allow a user to browse and select non-video content such as music or audio content including podcasts that may be presented or played back using the audio output capabilities of the system, or applications that may execute with content displayed on a television such as interactive games.

FIG. 6 also illustrates that targets 660 may communicate with data store 600 via paths 692. Such communication may include requests for video content, receiving device performance related information, viewer profile related information, or otherwise. Also shown is a communication path 692 that illustrates target devices may communicate with other target devices. Such communication may be peer-to-peer based type communication or otherwise. FIG. 6 also shows targets 660 coupled via a network 670 coupled to other sources 680. These other sources 680 may provide access to other sources of video content, Internet based content, or content directly provided by one or more of providers 620.

As discussed above, in various embodiments a viewer may have a primary subscription and one or more second subscriptions. For example, in FIG. 6 a viewer corresponding to one of the targets 660 may have a primary subscription to Apple TV, which in the example shown corresponds to server 600 and related operations. In such an embodiment, the primary subscription may be based on monthly fee, annual fee, or other periodic fee. Alternatively, the primary subscription may be based on the purchase of a set-top box or television with integrated components to support the primary subscription service. Still further, the primary subscription may be based on a combination of a periodic fee, the purchase of equipment, per item purchases, and/or otherwise. Whichever approach is used in a given case for the subscription, the primary subscription generally provides access by the viewer to content maintained within the data store of the primary subscription service provider (e.g., Apple TV). While content available to the viewer is maintained and provided by the primary subscription service provider, which content is available to the viewer according to the primary subscription is based upon one or more secondary subscriptions of the viewer.

As an example, a viewer may have a cable television subscription (secondary subscription). In addition, the viewer may have a subscription to the service provider associated with the data store (e.g., an iTunes account or similar subscription). The cable television operator (e.g., as shown as a provider 620) broadcasts video content, such as live television and video-on-demand content, 24 hours a day. Data store 600 is configured to record and/or otherwise capture all content broadcast/provided by the cable television operator and store the content as part of the data store 640. For example, data designated "A" in data store 640 may represent video content broadcast and/or otherwise provided or available from the cable television operator. Given the viewer's secondary subscription to the cable television operator service, the viewer's primary subscription to Apple TV (data store 600) entitles the viewer to access all of the content in the data store 640 that corresponds to the cable operator. Consequently, the viewer may view live television broadcasts of the cable television operator, which are provided by the data store 600 rather than the cable television operator. Additionally, as the data store 600 is constantly recording/gathering all of the cable operator content, the viewer may have access to content which was broadcast by the cable television operator a week ago, a month ago, or even a year ago, depending on how long the data store maintains the data and/or has rights to convey the data. It is noted, that as used herein, the term broadcast is not limited to a television broadcast in the traditional sense. Rather, broadcast may refer to conveyance of media content from any content provider or delivery system including Internet based providers, satellite based providers, conveyance of content in a viewer's own media store, or otherwise. Additionally, broadcast may be used to encompass multicast and point-to-point communication as well.

In various embodiments, the data store 600 is in principle generally configured to record all video data everywhere all of the time. In other words, the data store 600 operator may seek to store all video content available for viewing globally. Of course as a practical matter, it may not be possible to capture video content in such an all-encompassing manner. As such, the data store operator may generally seek to capture as much media content (audio and/or video, applications, images, etc.) as possible based on subscriber interests and other factors. Such an approach may seek to include storing all previously available video content anywhere in the world and continuously recording newly available video content that is deemed worthy of capture for business or other purposes. Acquisition of video content may generally necessitate license agreements with various copyright holders and providers. As noted earlier, particular content that has been acquired and resides in the data store 600 may be associated with multiple providers. However, while multiple providers may provide subscribers access to particular video content, it generally will not be the case that the data store 600 operator will need agreements with all such providers in order to acquire the content. Rather, in most cases, video content will have been acquired and stored as part of the content 640. The data store 600 operator will then form agreements with providers 620 which will entitle subscribers with primary subscriptions to the data store service 600 and a given secondary subscription to another service 620 to access secondary subscription available content from the data store 600. Depending on a viewer's secondary subscriptions, content within the data store 600 that is accessible to the viewer will vary. In various embodiments, rather than subscribing to all of a secondary provider's content, viewer's may be able to subscribe to a subset of the content offered by a secondary provider, or to combinations of subsets of content offered by multiple secondary providers. For example, a viewer may subscribe to only a particular network, a particular television series, a particular night of the week (e.g., the Thursday night lineup), subscribe according to varying durations (e.g., just the next two weeks), all shows of a particular genre across multiple secondary content providers (e.g. medical dramas; reality shows; etc.) or all content featuring a particular actor (e.g. all Alec Baldwin content), and so on. Numerous such alternatives are possible and are contemplated.

Figure 7:
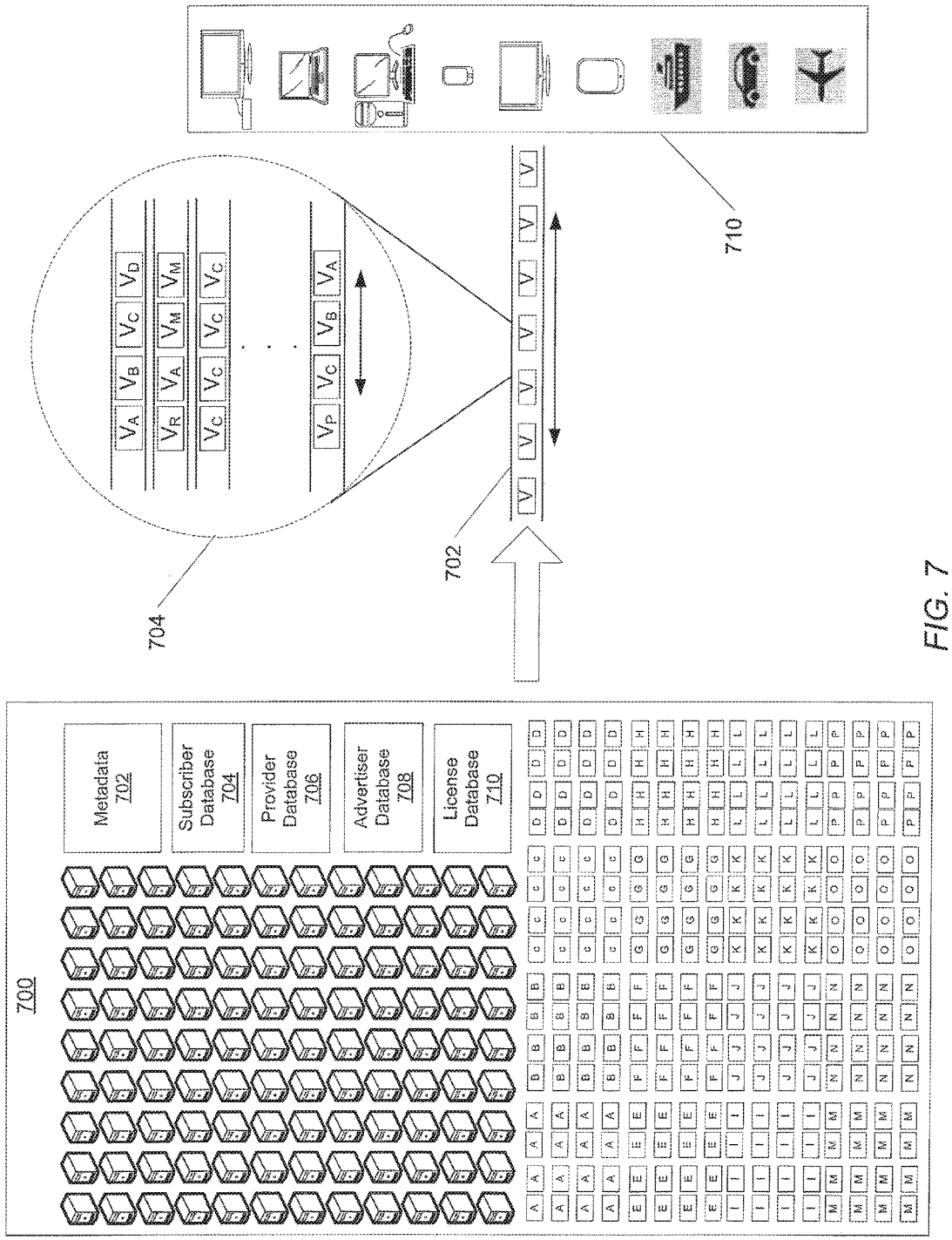
FIG. 7 depicts one embodiment of a portion of a television system.

While the embodiment of FIG. 6 contemplates a primary subscription provider and multiple secondary subscription providers 620, the viewing experience provided to the viewer is generally managed solely by the primary subscription provider. FIG. 7 illustrates a primary subscription based data store 700 coupled to provide video content to targets 710. As previously discussed, data store 700 stores data associated with multiple secondary subscription providers. By having a suitable secondary subscription, a viewer gains access to data in the data store 600 that represents data also provided by the secondary subscription provider. However, the secondary subscription provider does not provide the content to the viewer. Rather, the content is provided by the primary subscription provider. In some embodiments, the viewer may be able to receive content from a secondary provider. In some embodiments, responsive to a purchase by a viewer, the primary provider may obtain content from the secondary provider (assuming the primary provider does not already have the content) and convey/forward the content to the viewer. Conveying/forwarding the content in such a case may include reformatting and/or modifying associated metadata to conform to the primary provider's system requirements.

Additionally, the video environment within which the video content is provided (e.g., via a set-top box provided by the primary subscription provider, etc.) is controlled by the primary subscription provider. Such an approach eliminates or minimizes the viewer's need to navigate or otherwise deal with disparate secondary provider environments. To further enhance the viewer's experience, complications associated with managing secondary subscriptions may be managed through the primary subscription. For example, the primary subscription provider may identify content available to a viewer via a secondary subscription. Should the viewer wish to subscribe to the secondary provider, this may be done through the primary subscription service and may even be billed as part of the primary subscription service billing. This may be accomplished via the primary subscription service interface using a consistent visual/graphical approach. In such a manner, the system provides the viewer with a consistent interface and viewing experience.

As illustrated in FIG. 7, data store 700 includes multiple databases configured to store data associated with the stored video content. These databases include metadata 702, subscriber databases 704, provider databases 706, advertiser databases 708, and license databases 710. Metadata 702 may generally include data that identifies the nature of video content—type, size, title, duration, cast, secondary providers, etc. Subscriber databases 704 may include information regarding primary subscriptions and perhaps secondary subscriptions. Provider databases 706 may include information regarding secondary subscription providers. Advertiser databases 708 may include information regarding advertisers, advertisements, and corresponding agreements. License databases 708 may include license data related to stored content. It is noted that these databases are exemplary only. Numerous other and/or alternative databases may be maintained. Additionally, any suitable storage and/or transmission format for metadata and content may be utilized, such as XML, JSON, or otherwise. As shown, data store 700 conveys video data to targets 710 via a path 702. As depicted, the video content and associated metadata along path is conveyed in a manner to provide a consistent viewing experience—visually illustrated as "V"—which generally seeks to eliminate viewing experience differences generally associated with different video content providers. View 704 illustrates that differences associated with the video content regarding secondary subscriptions or otherwise are subjugated (e.g., identified via the metadata) to the larger viewing presentation. In this manner, viewers can access all content they are entitled to according to secondary subscriptions with one or more providers from a single provider via a single provider interface. Additionally, as all content is stored—the viewer may access content which was at one time provided by the secondary provider but is no longer provided by that provider. In various embodiments, the viewing experience is controlled by the primary provider by providing the hardware and/or software with which subscribers access the video content, or by controlling specifications of the hardware and/or software used by the subscribers.

Figure 8:
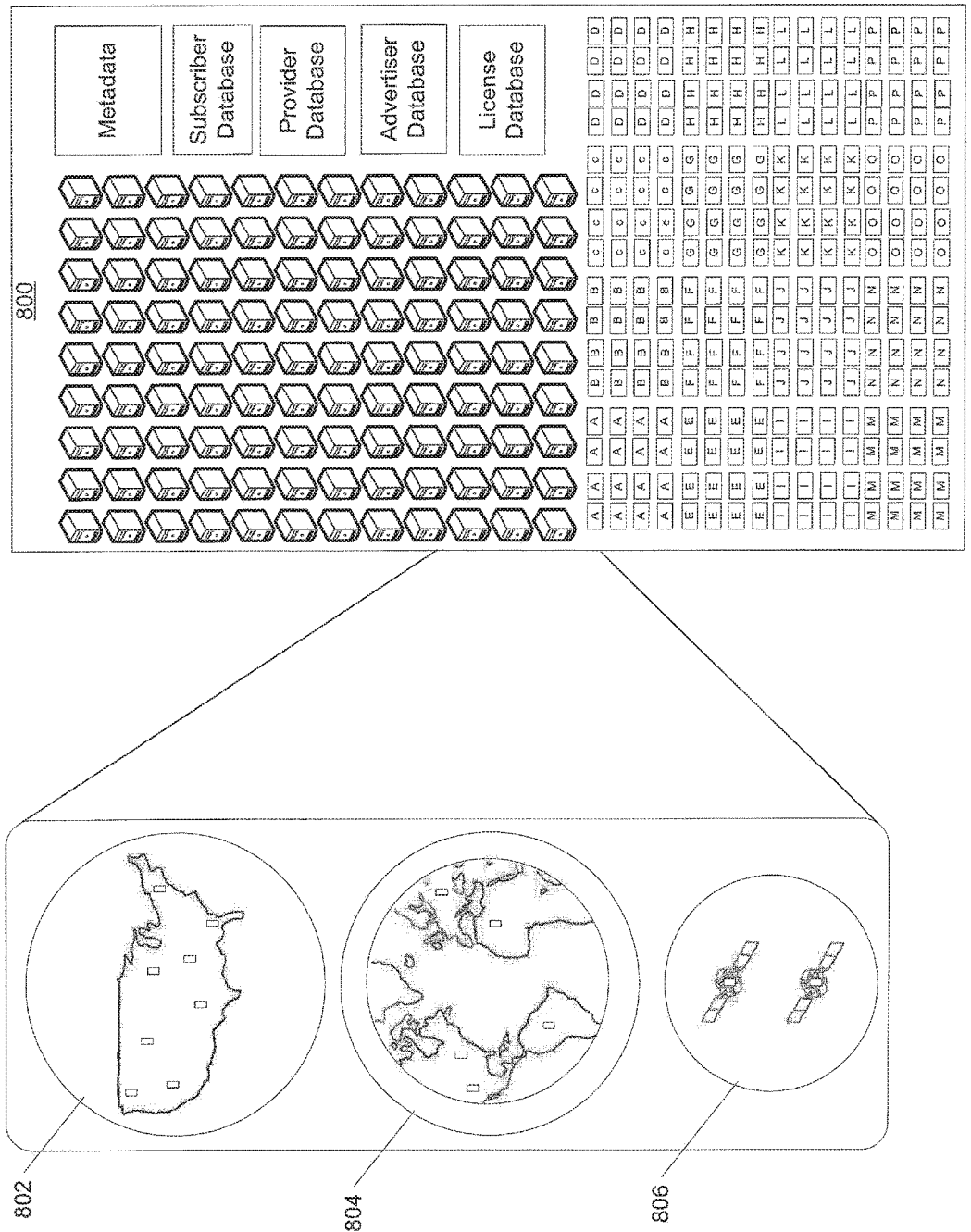
FIG. 8 depicts one embodiment of the distribution of video data store.

Turning now to FIG. 8, one embodiment of a data store 800 as previously discussed is shown. Generally speaking, data store 800 is distributed throughout a particular geographic region 802, strategically distributed throughout the globe 804, and may also include distributed portions in satellite based systems. Additionally, embodiments are contemplated in which peer-to-peer storage techniques may be used. In some embodiments, subscriber devices themselves may serve (at least in part) as storage for a distributed storage system. In this manner, data may be served to particular regions throughout the globe in a relatively efficient manner compared to having one or only a small number of server sites.

Figure 9:
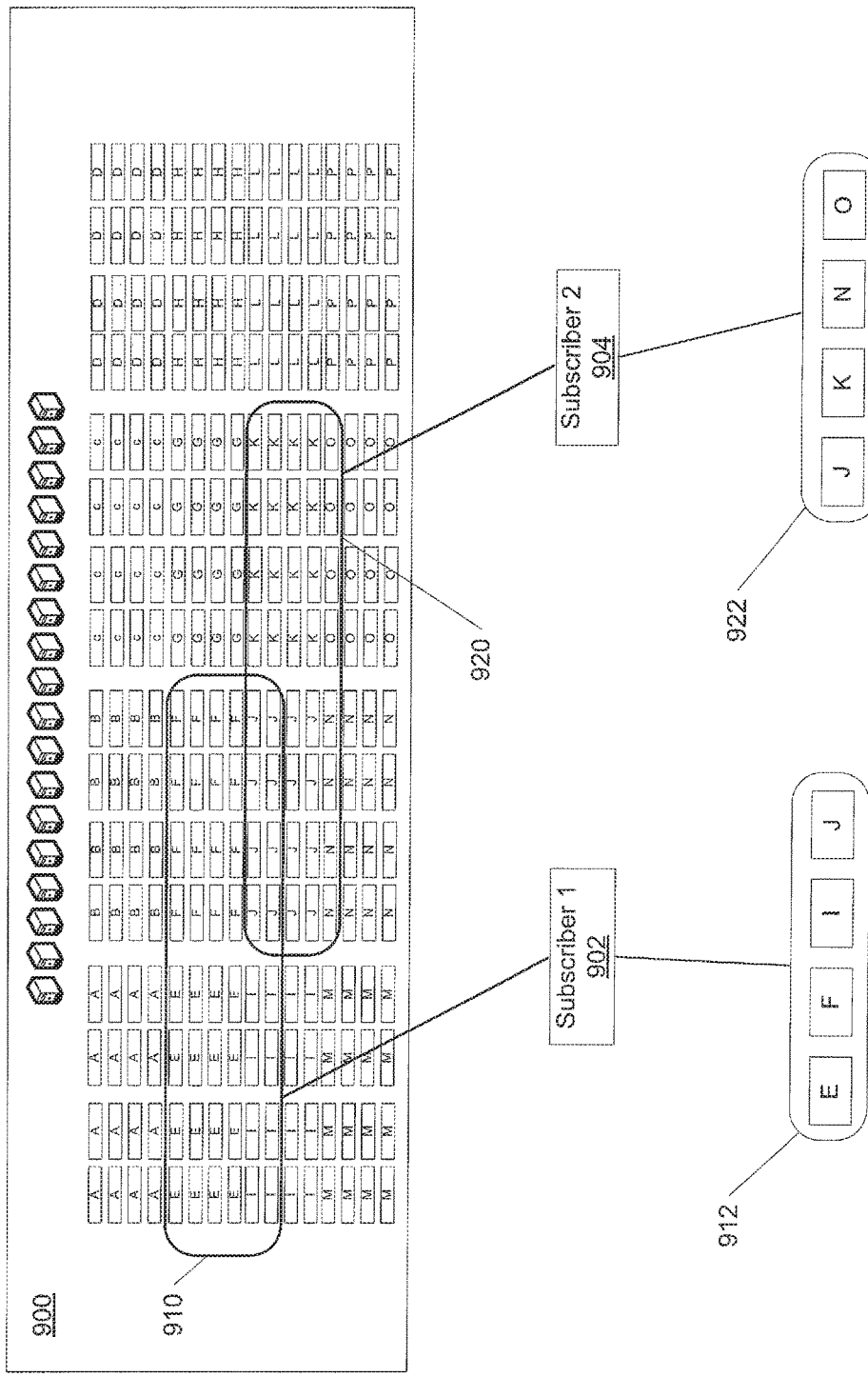
FIG. 9 depicts one embodiment of subscribers and video content.

Generally speaking in the prior art, a television subscription, such as a cable television subscription, is associated with one or more particular devices (set-top boxes). Such devices are uniquely identified by the cable television operator and communication is established with the device which enables the device to receive programming from the cable operator. In contrast, in various embodiments, primary subscriptions as described herein may be associated with particular subscribers rather than particular devices. Given such an approach, the subscriber's content may follow the subscriber wherever they or their devices may go. The following discussion illustrates these features. FIG. 9 depicts data store 900 including video content that corresponds to multiple secondary subscriptions/providers. A first subscriber 902 has four secondary subscriptions 912 E, F, I and J. This entitles subscriber 1 902 access (e.g., viewing privileges) to the E, F, I and J content 910 stored as part of the content associated with farm 900. A second subscriber, subscriber 2 904, has secondary subscriptions 922 J, K, N and O. This entitles subscriber 2 904 access to the J, K, N and O content 920 stored as part of the content associated with farm 900. In this example, both subscribers have secondary subscriptions providing access to the content J.

Figure 10:
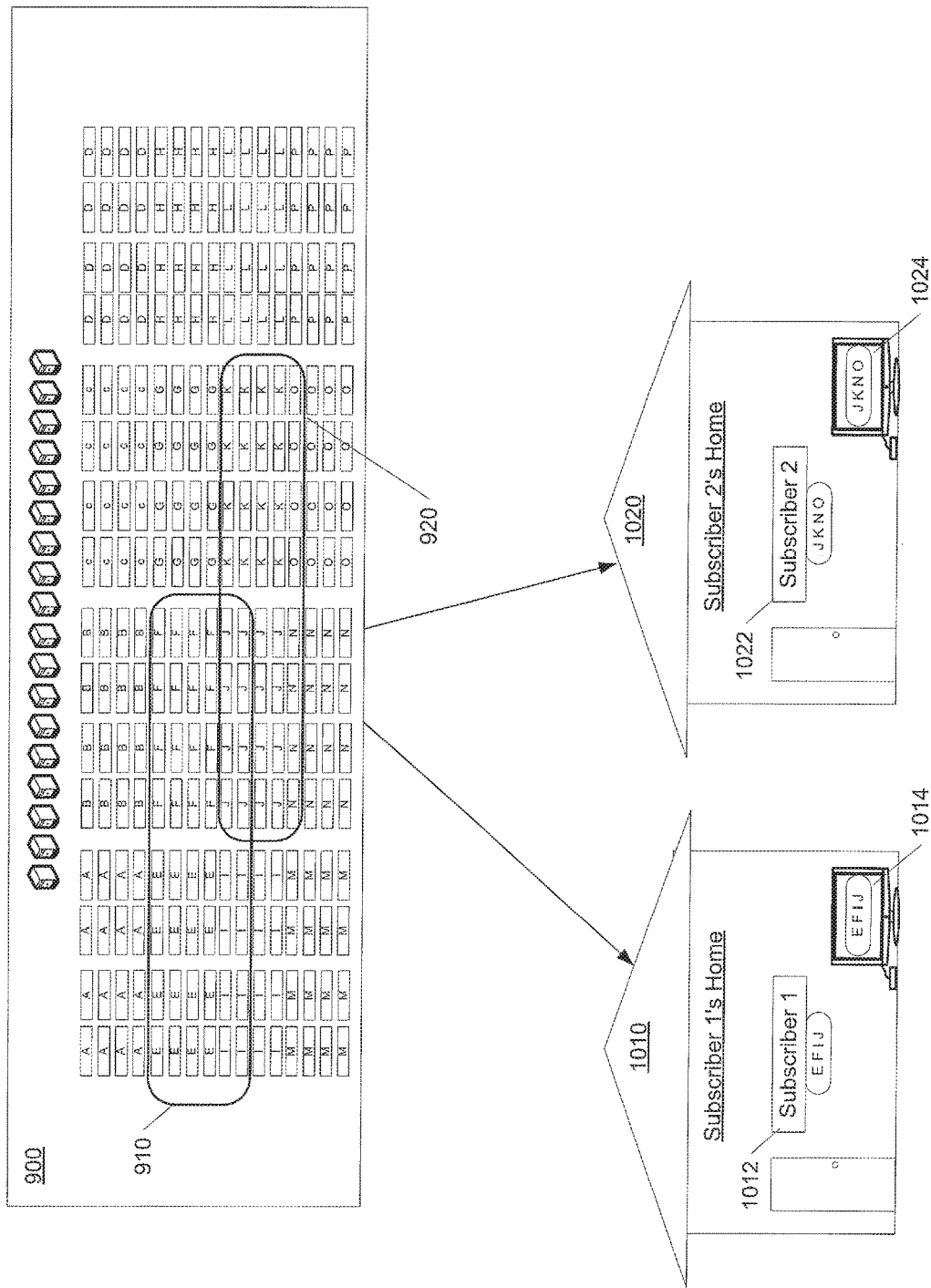
FIG. 10 depicts one embodiment of subscribers and video content.
Figure 11:
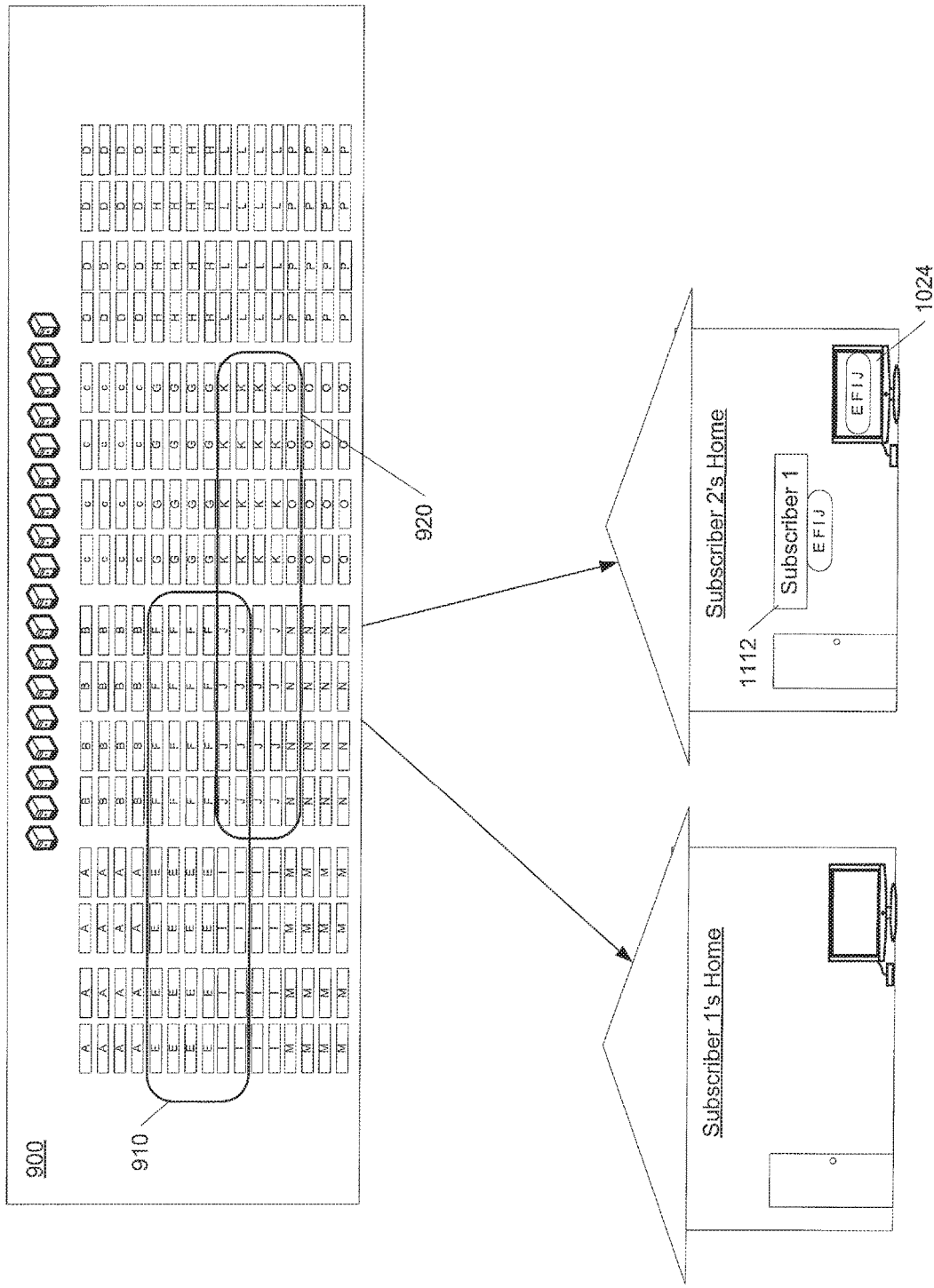
FIG. 11 depicts one embodiment of subscribers and video content.

Turning to FIG. 10, the homes of subscriber 1 1010 and the home of subscriber 2 102 are shown. Subscriber 1 1012 is shown to be present in the home 1010, and subscriber 2 1022 is shown to be present in home 1020. Subscriber 1 1012 is shown to have access to content E, F, I and J and the corresponding content is viewable on the television 1014. Subscriber 2 1022 is shown to have access to content J, K, N and O, and the corresponding content is viewable on the television 1024. FIG. 11 illustrates subscriber 1 1112 has now moved to subscriber 2's home. As subscriber 1's primary subscription is associated with subscriber 1 and is not viewable on a specific device, subscriber 1's content E, F, I and J is viewable in subscriber 2's home television 1024. Various embodiments for how subscriber 1's subscription follows the subscriber in this manner are contemplated. In one embodiment, subscriber 1's use of a remote control device in subscriber 2's home is recognized by the remote control and/or other video content display devices. For example, the remote control used with a set-top box may include biometric recognition capability to recognize a fingerprint, voice, or other characteristic of the person using the remote control. This biometric data could then be communicated to the set-top box and conveyed to the primary subscription provider for analysis. Identification of a particular subscriber may cause conveyance of particular codes or entitlement data to the set-top box, which then enables it to receive subscriber 1's content.

In other embodiments, password or other login type information may be entered via a remote control device. Authorization may result in codes or entitlement data being conveyed similar to that discussed above. Still further, in other embodiments, subscribers may have particular mobile devices associated with their subscription. For example, a subscriber's smart phone may be associated with the subscription. In some cases, the smart phone itself may itself be authorized to receive and display subscription based video content. Additionally, the smart phone may be useable as a remote control for a television system. In such an embodiment, the smart phone may be configured to communicate with a television, set-top box, or other video system component. Based on such communication, the set-top box or other device may convey the smart phone data to the primary subscription service provider. If the smart phone is identified as being associated with a valid subscription, then entitlement/authorization type data may be conveyed to the set-top, television, or otherwise, which enables it to receive subscriber 1's subscription based content. Such embodiments would enable the viewing of one's own subscription content at a friend's house. Alternatively, subscription content could follow a subscriber to a hotel room during travel. Numerous such scenarios are possible and are contemplated.

Figure 12:
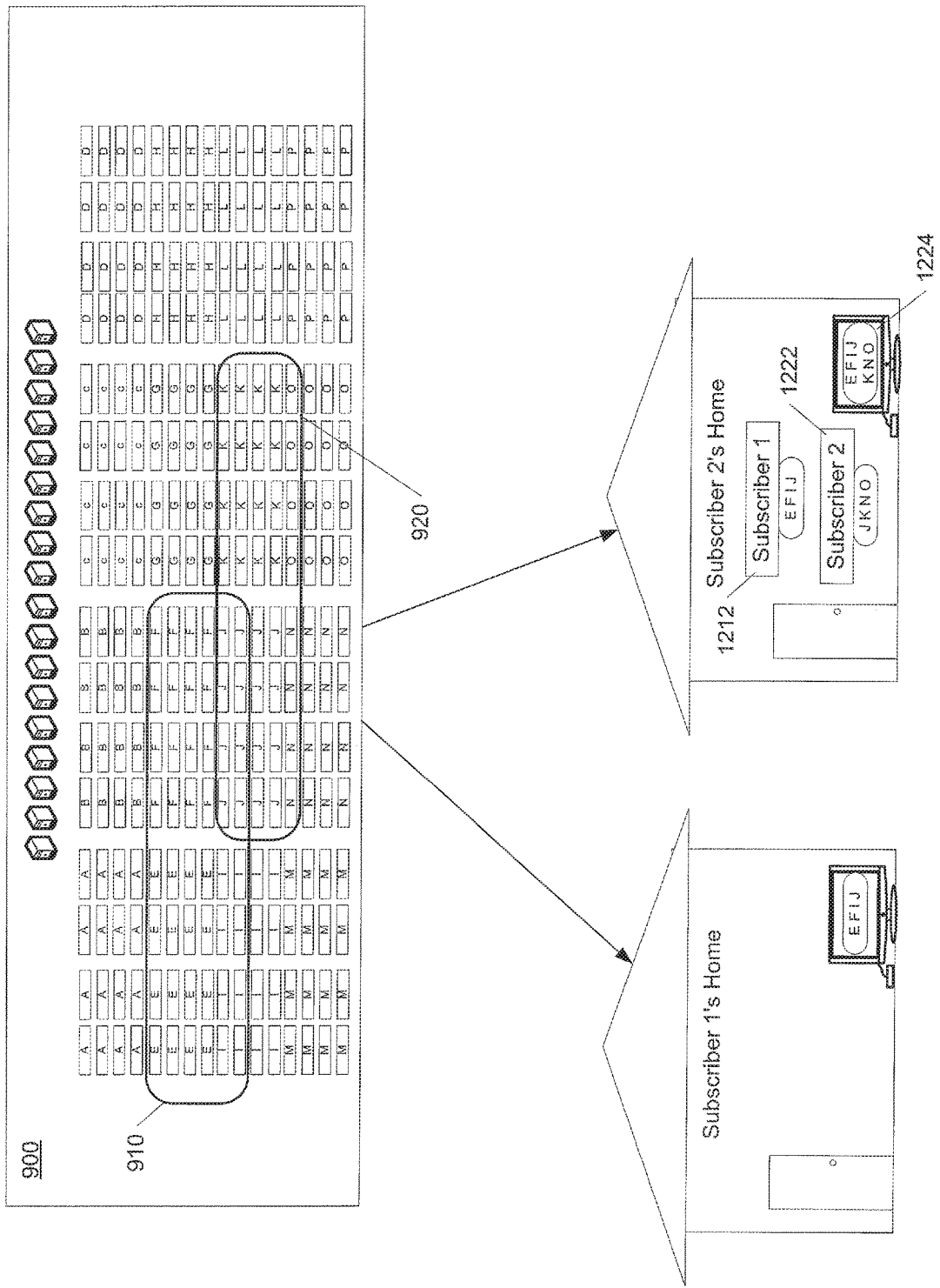
FIG. 12 depicts one embodiment of subscribers and video content.

FIG. 12 illustrates an embodiment in which subscription content for both subscriber 1 1212 and subscriber 2 1222 is concurrently available on the television 1224 in subscriber 2's home. In such an embodiment, a device such as a set-top box detects the presence of both subscribers and authorizes access to their combined content. In various embodiments, such as the smart phone embodiment described above, the detection and identification of the smart phone triggers the authorization mechanism for the subscriber content. In such an embodiment, the smart phone may have a setting that enables or disables the mechanism. For example, in one embodiment the mechanism may be enabled and have a broadcast mode in which the subscriber needn't take any action to cause the authorization to take place. The mere presence, such as walking in to the home, results in the set-top box being authorized to receive the subscription-based content. In such an embodiment, simply walking into a neighbor's home may result in the same authorization. If such authorization is not desired, then the smart phone (or other mobile device) may have a setting that disables the automatic authorization mechanism.

In some embodiments, the feature of having a subscriber's content follow the subscriber and be displayed on another device (e.g., a friend's television or a hotel room television) may be a feature that is provided at an additional cost (e.g., a small monthly fee). Additionally, such a feature (which may be referred to as a "follow me" mode) may be enabled or disabled. For example, in some embodiments, when subscription content follows a subscriber to another location where it is then viewed, that content is not simultaneously viewable in the subscriber's home. In various embodiments, such a mode may be controllable by both a set-top box in the subscriber's home as well as by the subscriber while not at home. If desired, primacy may be given to the set-top box at home. In this manner, content may follow the subscriber away from home, but when someone at the home wishes to access particular subscription based content it is permitted and the follow me mode is temporarily disabled. Numerous such alternatives are possible and are contemplated.

Figure 13:
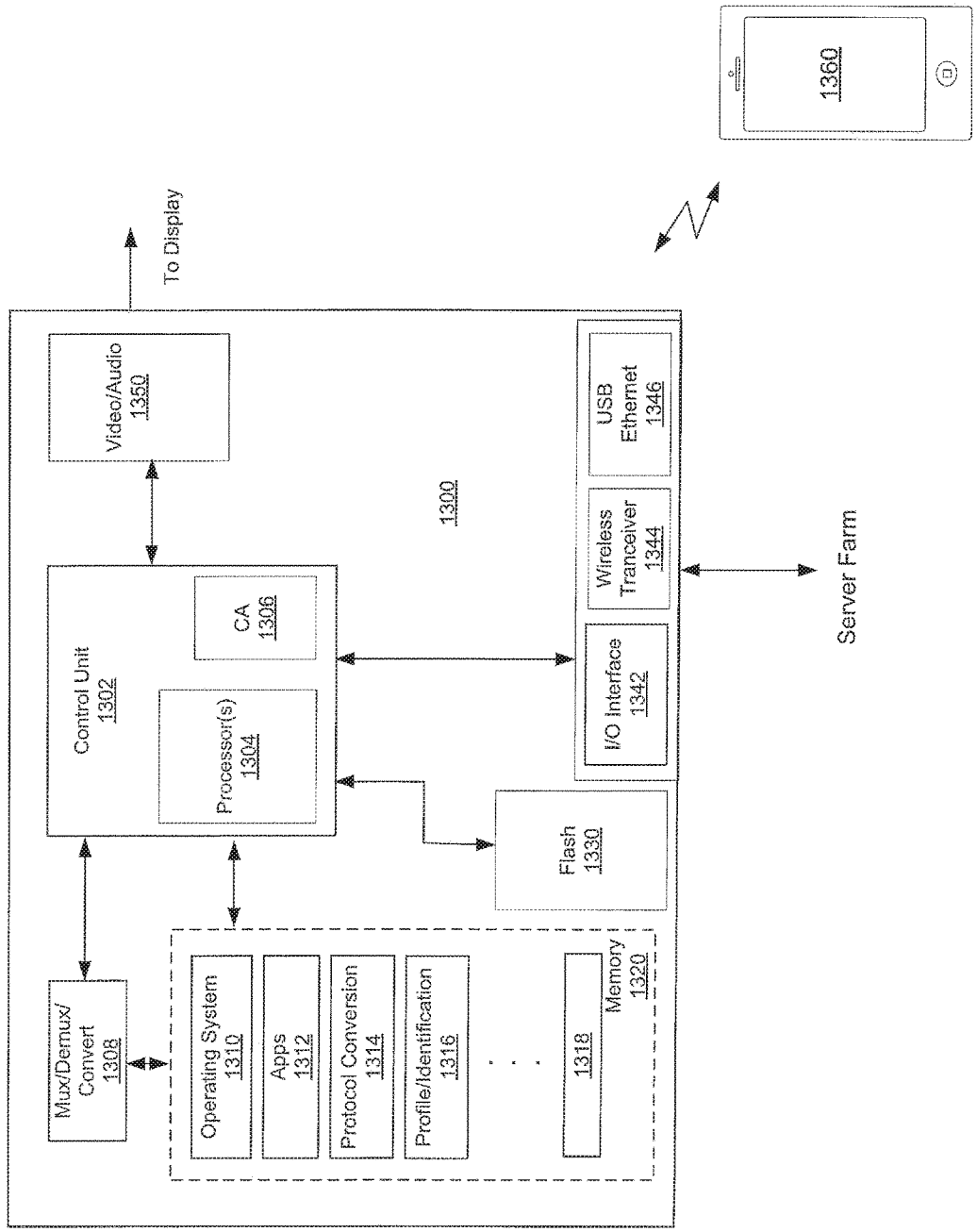
FIG. 13 depicts one embodiment of a receiver and mobile device.

Turning now to FIG. 13, a general block diagram illustrating one embodiment of a set-top box 1300 and mobile device 1360 is shown. Set-top box 1300 is shown to include a control unit 1302 including processor(s) 1304 and conditional access (CA) type unit 1306. Set-top box 1300 includes memory 1320, persistent memory (Flash) 1330, I/O interfaces 1342, wireless transceiver 1344 configured to support WiFi, Bluetooth, or any other wireless communication protocol, and USB, MoCA, and Ethernet, and other interfaces including, for example the Apple Thunderbolt interface 1346. A mux/demux/convert unit is included which may be configured to receive, demultiplex, and convert the formats of receive signals. A video/audio unit 1350 is included to convey audio and video data to a display device. Such audio and video data includes audio/video content received by the set-top box and also includes any overlays or other graphic elements generated by the set-top box 1300. Also included are operating system components 1310, applications (apps) 1312 executable by the processor(s) 1304, components 1314 for use in converting between communication protocols, viewer profile/identification 1316 related components, and any other 1318 suitable components. In various embodiments, the set-top box can optionally exclude tuners in the conventional sense. In other words, the set-top box can have no QAM or ATSC tuners. Rather, in various embodiments, the set-top box receives video content via a network interface such as an interface coupled to the Internet.

In various embodiments, the set-top box 1300 can optionally exclude mass storage (such as a disk drive or similar DVR type mass storage device) and is not configured to provide access to locally attached mass storage. Rather, sufficient storage for some video buffering, operating system and application memory resident operations, and so on, may be all that is provided. In such an embodiment, the set-top box 1300 is generally configured for video streaming and not video storage. Other embodiments could include or provide access to local mass storage. Mobile device 1360 may be a dedicated remote control device, smart phone, or other device that is configured to communicate with the set-top box 1300. As discussed above, in various embodiments the device 1360 may be identifiable as being associated with a subscriber. Responsive to such identification (e.g., using identification component 1316 and communication with a subscription service), the set-top box may be authorized to receive subscriber content. In other embodiments, biometric data may be entered to the device 1360 (e.g., a fingerprint or voice sample) which is then used for authentication/authorization. Various such embodiments are possible and are contemplated as per the discussion above.

Figure 14:
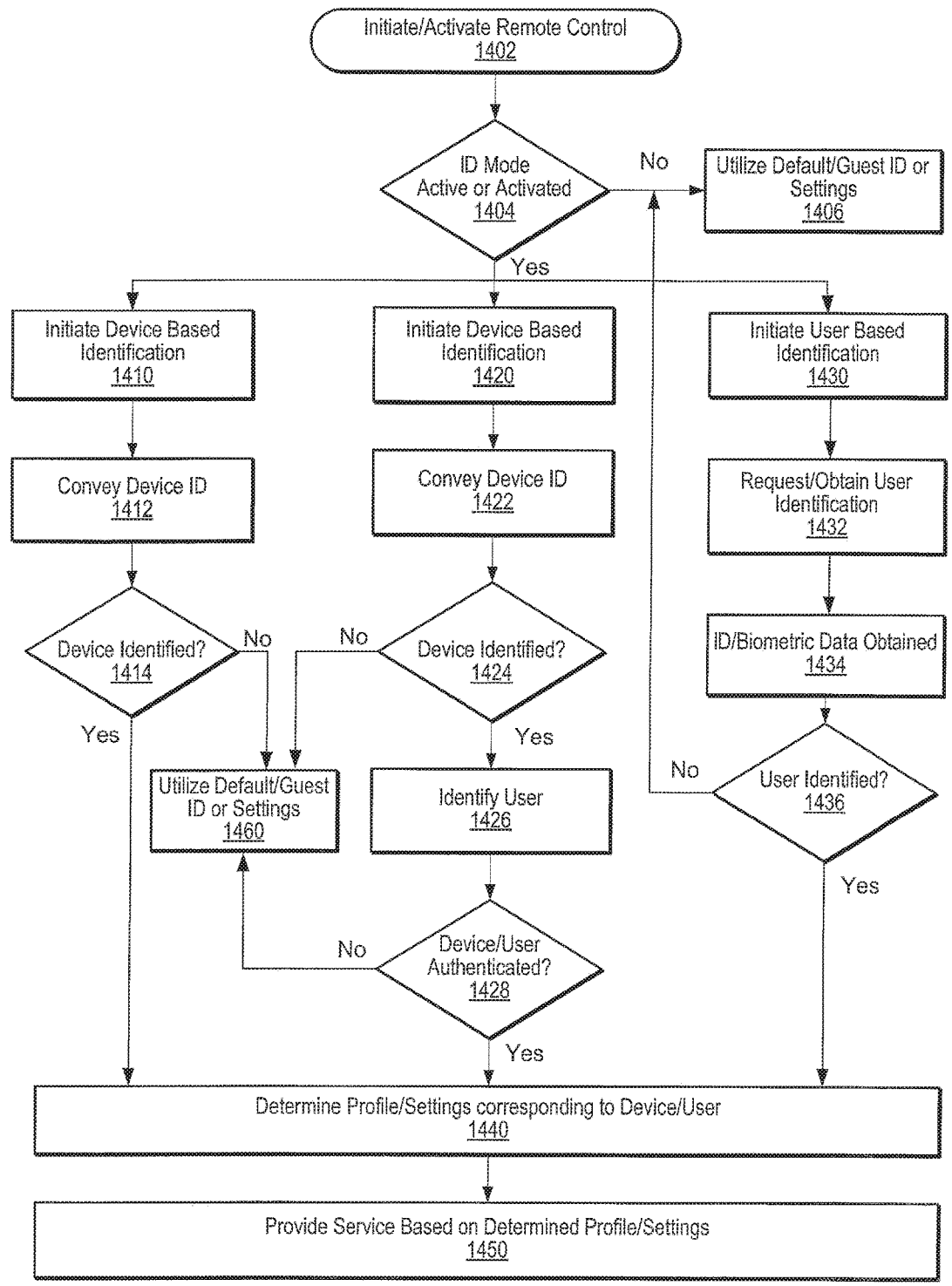
FIG. 14 depicts one embodiment of a method for identifying a subscriber.

FIG. 14 illustrates one embodiment of a method for use in identifying a subscriber and authorizing the receipt of subscriber content at a particular device. In the method shown, a remote control or other handheld device is used to initiate or activate the procedure (block 1402). In various embodiments, such activation may be initiated by starting a particular app on a smart phone, detecting movement of a remote control via an accelerometer or similar device, pushing a button on a remote control, detecting and optionally identifying a fingerprint of a finger resting on a touch pad of a remote control, recognition of a voice in response to the receipt of a voice command, and so on. In an embodiment in which the identification mode may be enabled and disabled, if the mode is disabled (decision block 1404), default settings or guest ID type settings (1406) may be used for the set-top box, television, or other associated video display device. For example, by default a set-top box may be configurable by a viewer to display particular content (for example, content that corresponds to the owner of the home in which the set-top box is located). If ID mode is activated (decision block 1404), then an identification/ authorization procedure is initiated. For ease of discussion, three different embodiments are illustrated in FIG. 14. Block 1410 corresponds to an embodiments in which identification is based on the mobile device being used to communicate with the set-top box (e.g., the smart phone based example described above). A second embodiment proceeds with block 1430 is represents a biometric or other approach that is not based on the particular mobile device being used. Finally, a third embodiment begins with block 1420, which represents a combination of device and user identification. Depending on the embodiment, one of these three paths will be chosen. In various embodiments, only one such path/ embodiment is available. In other embodiments, multiple such paths/embodiments are available and may be selected as a preferred method by configuring the set-top box or other receiving device accordingly.

Beginning with block 410, device based identification is initiated. In this embodiment, an identification of the mobile device 1412 is received by the set-top box from the mobile device. While a set-top box is described as the receiving device for purposes of discussion, it is to be understood that the receiving device may be a television with supporting circuitry, a game console with supporting circuitry, or otherwise. Having received the device identifier, an effort to identify the device is undertaken (decision block 1414). Such identification may include communication with the subscription provider which accesses a subscriber database or otherwise to determine if the mobile device is associated with a subscription. In other embodiments, the set-top box may store device identifiers for a certain period of time (e.g., 24 hours) with associated authorization information. In such an embodiment, re-authorization would only be needed once per day or according to some other time interval. In such embodiments, the subscription provider may be able to invalidate such set-top box data at will in order to require re-authorization. If the device is not successfully identified, then default or guest settings 1450 may be used. If the device is successfully identified and it is associated with a valid subscription, then settings that correspond to the subscription may be obtained (e.g., settings for the set-top box environment, settings for the particular user, etc.) (block 1410), and access to the subscription based content is authorized (block 1450).

Alternatively, the path may begin with block 1430 where user based authentication is initiated. In such an embodiment, user identification may be requested by the remote control/mobile device (block 1432). In response, a viewer provides biometric or login type data (block 1432). If the user identification is successful (block 1436), then the method continues with block 1440. Otherwise, default or guest settings may be used (block 1406). User identification may include a process similar to that described in association with block 1414.

Finally, the third approach begins with block 1420 where device based identification is initiated. In this embodiment, the device is first identified (blocks 1422 and 1424). If the device is successfully identified, then an attempt to identify the user is made (block 1426). This may be used to verify that the remote control/mobile device is being used by the rightful owner or otherwise expected user. If both the device and user are properly identified as corresponding to a valid subscription (decision block 1428), then the method proceeds with block 1440. Otherwise, default or guest settings may be used (block 1406). In each of the embodiments, default settings may be configurable and may include disabling access completely, conveying a communication (email, text message, etc.) that indicates the failed attempt, or otherwise.

Figure 15:
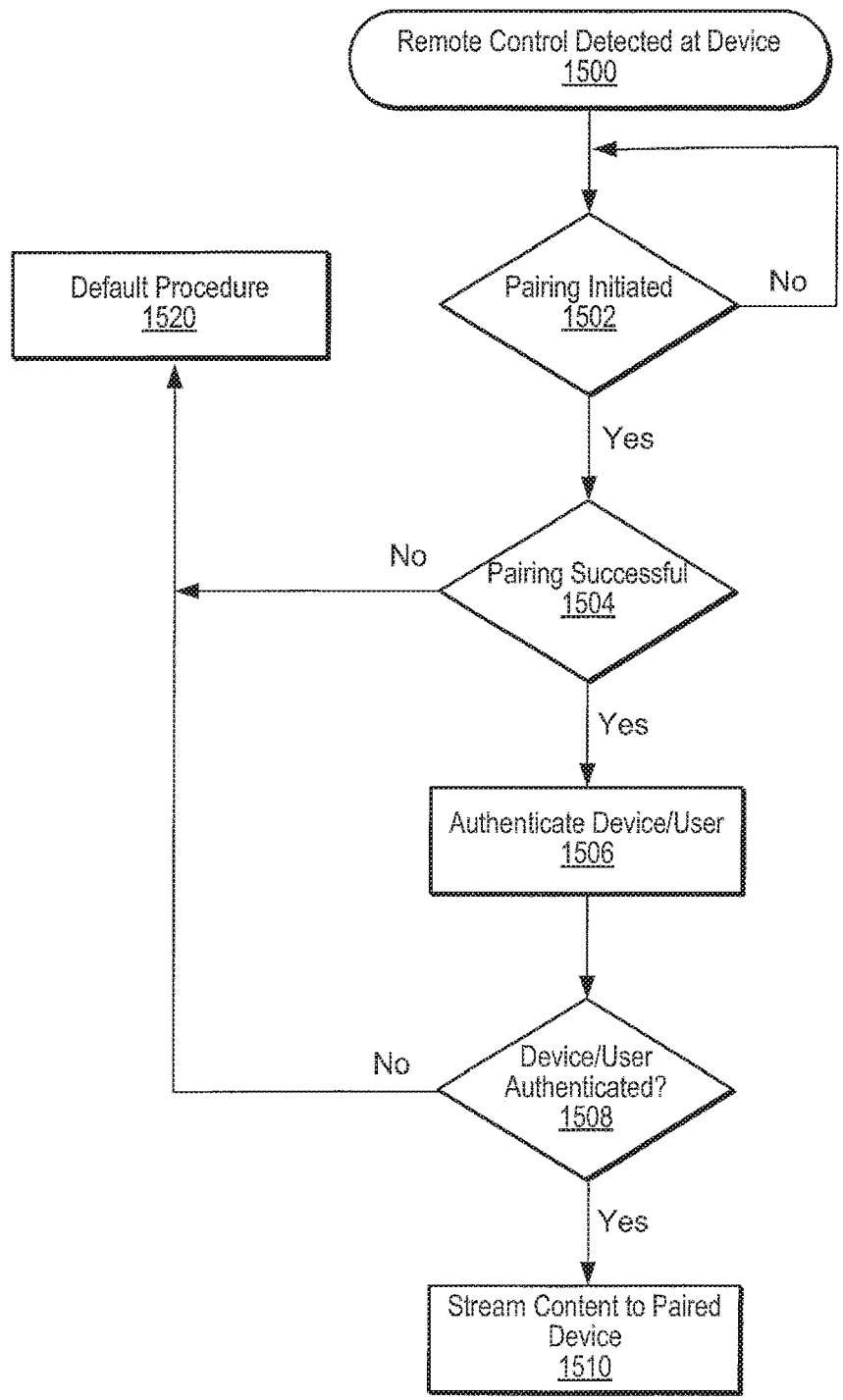
FIG. 15 depicts one embodiment of a method for pairing a television and mobile device.

Turning now to FIG. 15, one embodiment of a method for pairing a remote control or other mobile device with a set-top box or other video display device is shown. In various embodiments, a remote control or other device may use Bluetooth or any other suitable wireless communication protocol to establish communication with a set-top box or other device. In the example shown, a remote control device is detected (block 1500). This detection may be pursuant to an explicitly initiated detection procedure, or could be based on a constant broadcast and detection mechanism. Responsive to detecting a device, a pairing attempt may be initiated (decision block 1502). If pairing of the remote control with the set-top box is successful (decision block 1504), then device and/or user authentication is initiated (block 1506). This authentication may correspond to the various embodiments discussed in relation to FIG. 14. If authentication is successful (decision block 1508), then streaming of the subscription based content to the paired device (e.g., set-top box) is authorized. If authentication is not successful (decision block 1508), then a default procedure may be used (block 1520). This default procedure may include disabling access to the set-top box, using default or guest settings, or any other procedure deemed suitable.

Figure 16:
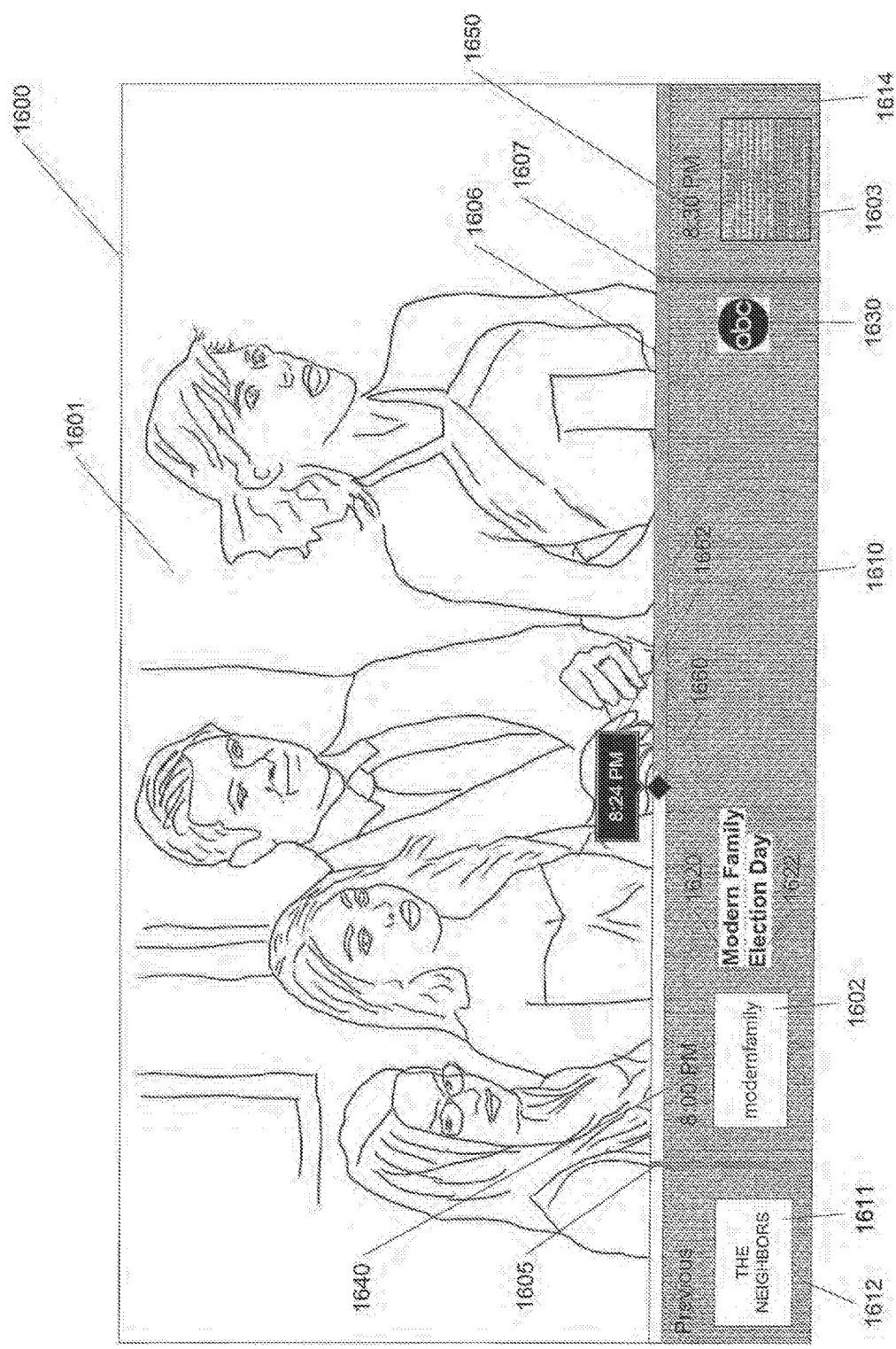
FIG. 16 depicts one embodiment of a video display.

In the following discussion, various embodiments of a video display environment are shown that utilize the foregoing methods and mechanisms. FIG. 16 depicts the display area of a display device 1600 that may appear on a television or other device. Display 1600 is shown displaying video content 1601 that is streamed from a subscription based service provider (e.g., Apple TV). Also shown in the lower portion of the display 1600 is a "scrubber" bar 1606 and channel bar 1610. In various embodiments, scrubber bar 1606 and channel bar 1610 are graphic overlay elements generated by a set-top box on top of the video content 1601. In the example shown, channel bar 1610 includes a central portion, which corresponds to the currently displayed video content (an episode of the modernfamily television episode). This central portion includes a title 1620 for the currently depicted television series (Modern Family), and title 1622 of the currently depicted episode (Election Day). Also included in the central portion is a small image 1602 that corresponds to the currently depicted video content. In various embodiments, this image 1602 may be a still image, video content, animation, or otherwise corresponding to the television series or the particular episode. Also shown in the central portion is a beginning time indicator 1640 (8:00 PM) for the currently depicted video content. The central portion also includes an identification 1630 of the channel to which the currently displayed channel bar corresponds.

The central portion 1610 of the channel bar is separated from a first portion 1612 by a first separator 1605, and a second portion 1614 by a second separator 1607. The first portion includes the designation "Previous" and includes an image 1601 of a television program which immediately preceded the currently displayed content on the channel identified by the indicator 1630 (the same channel as the currently displayed content). The second portion 1614 includes an image 1603 that corresponds to the television program that immediately follows the currently displayed content on the identified channel 1630. The second portion also includes a time indicator 1650 (8:30 PM) that indicates at what time the television program identified in the second portion 1614 begins. The scrubber bar 1606 includes a current position indicator 1660 that is used to indicate the current position of the displayed content 1601 within the television program identified in the central portion 1610 of the channel bar. Also shown is a time indicator 1662 that corresponds to the current position indicator 1660. In the present example, the video content 1601 is that of a live television broadcast. As such, the scrubber bar to the left of the position indicator 1660 has a different appearance from that of the scrubber bar to the right of the position indicator 1660. The lighter colored portion to the left of the indicator 1660 indicates already broadcast content. As the content has already been broadcast, it is possible to rewind back into that content. The darker colored portion of the scrubber bar to the right of the position indicator 1660 indicates content which has not yet been broadcast. Consequently, it is generally not possible to fast forward to such (future) content. It is noted that as used herein, the term "program" may refer to not only television programs provided by a television network in the traditional sense, but the term encompasses media content conveyed by any content provider. For example, the term program may refer to a song, movie, viewer generated video, one or more still images, or otherwise.

In various embodiments, the display shown in FIG. 16 is presented as a uniform presentation to the viewer. In other words, the viewer is not provided any indication that any element of the presentation corresponds to other than a single subscription (e.g., a cable television subscription). However, in embodiments according to the primary and secondary subscriptions as discussed above, the primary subscription based provider of the content displayed in FIG. 16 has aggregated and stored video content corresponding to numerous secondary subscription based providers. Accordingly, while a viewer may perceive the content displayed in FIG. 16 as representing that corresponding to a cable television subscription (for example), in fact the primary subscription provider provides the content in a manner that is agnostic with regard to its associated source. In other words, the viewer may have a cable television subscription with a given cable television operator.

A viewer's secondary subscription entitles the viewer to access particular content stored in the primary provider's data store that represents the cable television subscription content. The content actually provided to the viewer may not have been obtained from the cable television operator. The content in this case is fungible as to its source. Similarly, the content depicted as the previous television program 1612 and the content depicted as the next television program 1614 are likewise fungible as to source. If the viewer rewinds into the "Previous" content 1612, the content displayed may in fact be video content that was recorded and stored in the data store a year ago (e.g., assuming the episode was a rerun and was originally broadcast at least a year ago). From the perspective of the viewer, they had simply rewound to buffered content that was broadcast within the last hour. Additionally, the content itself may have actually been acquired from a cable television or other operator other than the one to which the viewer has a subscription. In each case, the original source of the video content is unimportant to the primary provider. All content is provided directly by the primary provider, and sources of content are relevant to the extent that they are used to identify content available according to a given secondary subscription. Similarly, the next television program 1614 may be obtained by the primary provider from a source other than the subscribed cable television operator.

Figure 17:
FIG. 17 depicts one embodiment of a video display.

FIG. 17 illustrates an embodiment in which a display 1700 with video content has depicted a "Recommendations" portion 1710. This portion 1710 may be at least in part an overlay generated by a set-top box with the incorporation of selected images 1720, 1720 and 1740 received via the primary provider. In various embodiments, the video content may continue playing while the overlay 1710 is presented. In other cases, the video content could be automatically paused. Additionally, the overlays may be semi-transparent to allow the underlying video to be partially visible. Numerous such alternatives are possible and are contemplated in this and other displays described herein. The display of such recommendations may be initiated directly via a remote control key press, or could be initiated automatically (e.g., at the end of the television program currently displayed). In the example shown, a variety of content is depicted as being currently available for viewing. In particular, three different television series are shown as being available—5 seasons of Mad Men, 2 seasons of Game of Thrones, and 1 season of Suburgatory. As the primary provider is generally configured to record all video data all of the time as previously discussed, all video content related to these series is available for the viewer. As previously discussed, depiction as to what is available to a viewer may be based on what the viewer currently has subscriptions to view or anything available for provision by the primary provider. In this case, anything may be displayed as available for the viewer.

Figure 18:
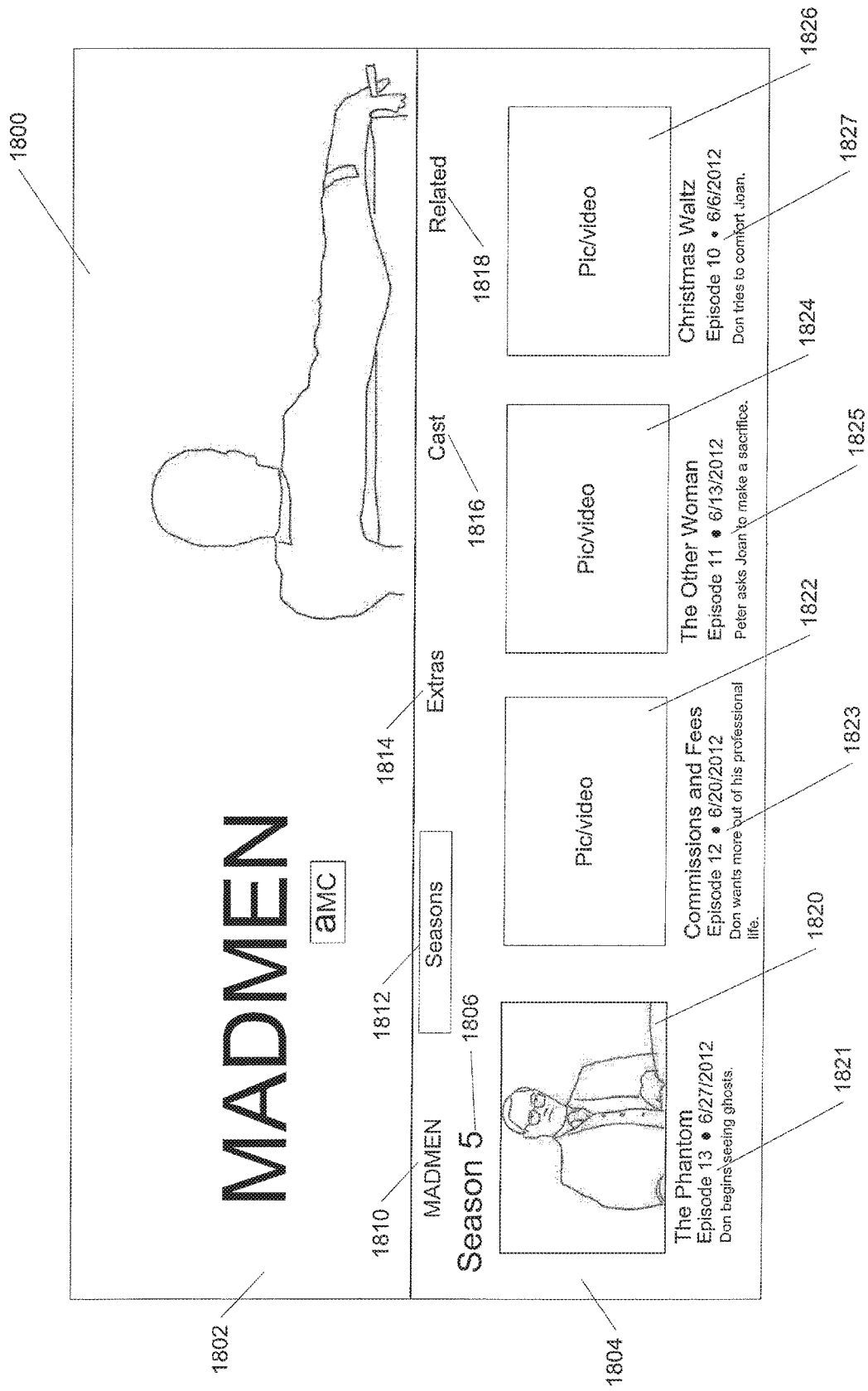
FIG. 18 depicts one embodiment of a video display.

In the embodiment shown, each of the displayed series in the recommendation portion 1710 represent selectable items by the viewer. Assuming the viewer selects the Mad Men item 1720, in one embodiment a display such as that of FIG. 18 is provided. Display items in FIG. 18 may be provided by a set-top box and various elements may be generated by the set-top box. FIG. 18 is a "landing page" 1800 for the Mad Men television series. In the embodiment shown, the display 1800 generally includes an upper portion 1802 and a lower portion 1804. The upper portion generally includes artwork associated with the television series, a title of the series (MADMEN), and an identification of the network (aMC) on which the series appears. The artwork may in various embodiments be video, stills, animations, or otherwise.

The middle portion of the display 1800 includes selectable elements 1810, 1812, 1814, 1816, and 1818. Selection of a given element, such as with a remote control, may cause the display of different corresponding content. In the example shown, element 1812 "Seasons" has focus and elements corresponding to season 5 are shown. Focus in this example is illustrated by a box encompassing element 1812. Numerous other ways of indicating focus are possible and are contemplated. In this example, a title ("Season 5") 1806 corresponding to the below elements is shown. Images 1820, 1822, 1824, 1826, and descriptions 1821, 1823, 1825, and 1827 corresponding to four different episodes are depicted. The images (1820-1826) each generally correspond to the given episode and may be still, video, animations, or any combination of these. Underneath each image is a description of the corresponding episode including title, episode number, original air date, and brief description. In various embodiments a viewer may selected one of the images to either immediately begin display of the corresponding video or display of a page corresponding to the particular episode.

As discussed previously, the primary provider is agnostic as to the source of any of these episodes and the date of acquisition of any of these episodes. While the depicted series airs on the AMC network, the primary provider needn't have acquired it from that network. Additionally, while four consecutive episodes are depicted in FIG. 18, the content provided to the viewer may have been acquired in an order that does not match that of their original airing. Still further, the primary provider may be able to provide the selected content in formats not originally available from the original source (the AMC network). For example, the primary provider may transcode content according to varying requirements of receiving devices. Additionally, content may be transcoded to a varying quality levels not originally available. All such alternatives are possible and are contemplated.

Figure 19:
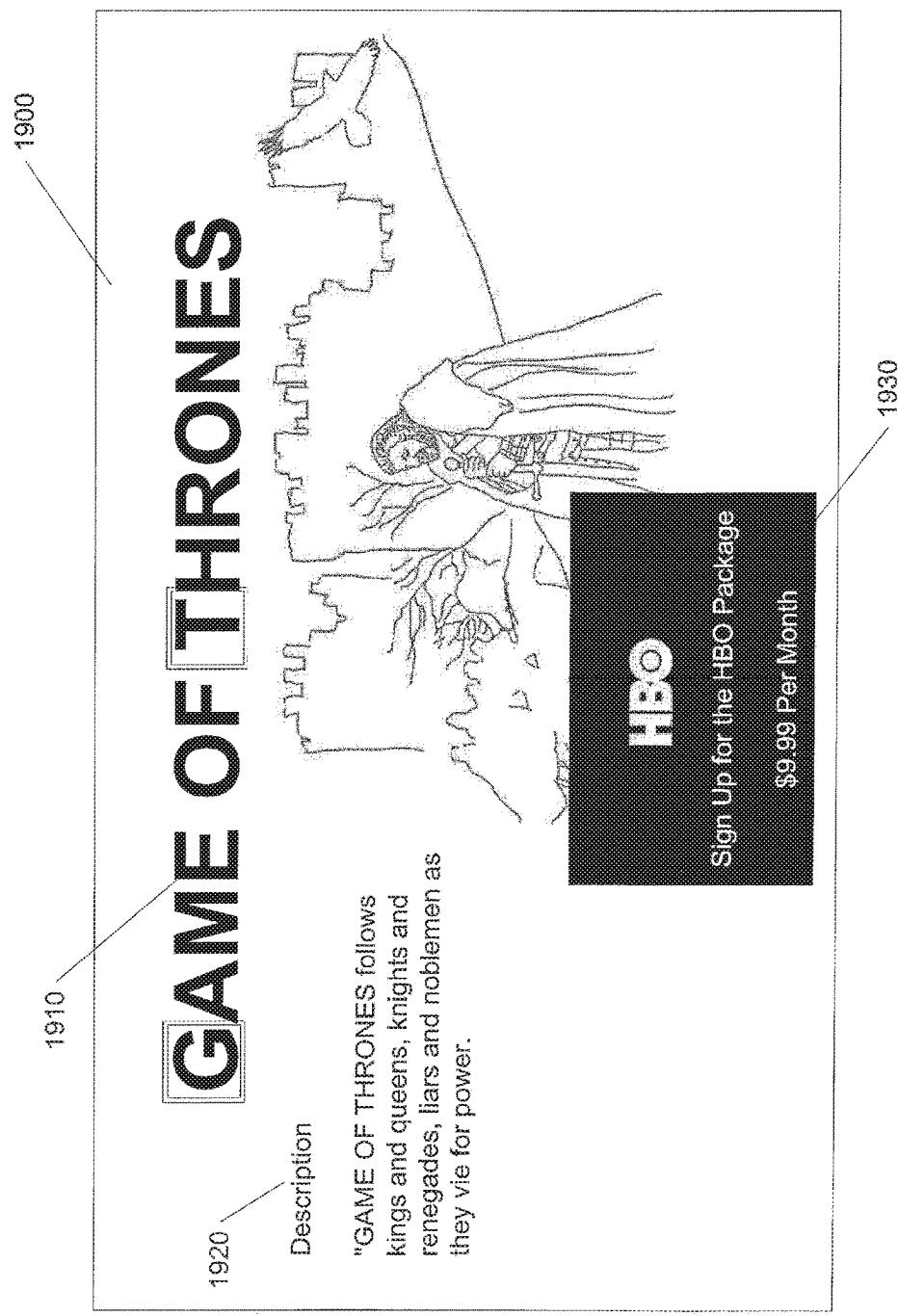
FIG. 19 depicts one embodiment of a video display.

FIG. 19 illustrates a landing page for the Game of Thrones selection of FIG. 17. In this case, the landing page 1900 provides video content (video, still, or animation), a title of the series 1910, and a description of the series 1920. In this example, the viewer does not have a subscription to the access the content (e.g., a secondary subscription to HBO). Therefore, a banner is displayed 1930 that informs the viewer that the series is not currently available according to their current subscriptions and advises that they may sign up (subscribe) for $9.99 per month. In various embodiments, a user may select the banner and immediately subscribe to HBO. In various embodiments, the viewer makes the subscription through the primary provider, which handles communications with the HBO subscription service. In some embodiments, billing for the HBO service may be included in the viewer's primary provider bill. In such embodiments, subscribing to HBO may be as simple as a couple of button presses to authorize the subscription. Following this simple subscription process, all of the HBO content held by the primary provider is immediately available to the viewer. In other embodiments, rather than subscribing through the primary provider, the viewer may be taken to an HBO subscription service site to complete the subscription process. Billing may be direct to the viewer or included with the primary provider billing as mentioned above.

Figure 20:
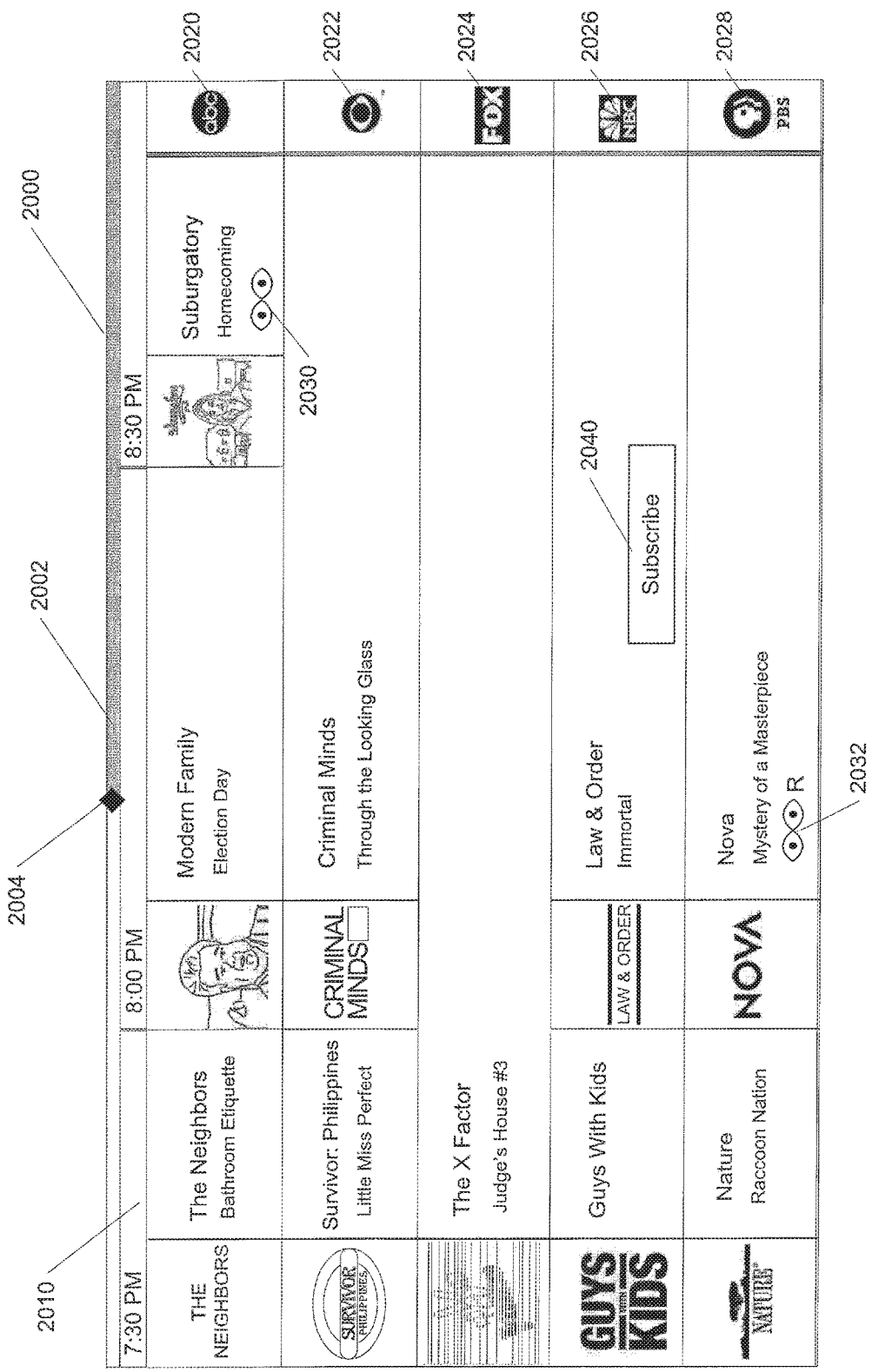
FIG. 20 depicts one embodiment of a video display.

Turning now to FIG. 20, one embodiment of an electronic program guide (EPG) 2000 is shown to illustrate other features of the described system. EPG 2000 includes a scrubber bar 2002 similar to that previously described with a current position indicator 2004. Also included is a time bar 2010 displaying time periods for the grid. A separate row is included for each of five different television channels—ABC 2020, CBS 2022, FOX 2024, NBC 2026, and PBS 2028. Each portion of the grid for a given time slot then displays an image, series title, and episode title for a television program. For example, the 7:30 PM time slot for the CBS network includes an image for the Survivor Philippines series with series title and episode title Little Miss Perfect. As in the previous example, the display corresponds to live television broadcast and the scrubber 2002 depicts an already broadcast portion (light colored) and an as yet broadcast portion (darker colored). However, a "watch now" indicator 2030 indicator appears for the show "Suburgatory" to be broadcast at 8:30 PM. As suggested, this indicator identifies content that is available for viewing immediately. Similarly, the "Nova" program includes a watch now indicator 2032 indicating it is immediately available for viewing. Having such watch now indicators in an EPG may correspond to future broadcasts. However, given the systems, methods and mechanisms described herein, this is entirely possible.

As previously discussed, the systems described herein are generally agnostic as to a source of particular video content and as to a timing of its acquisition. Consequently, the constraints suggested by an EPG are no longer present. The television service provider that provides an EPG does so to inform the viewer as to the availability of video content. In this manner, the viewer can view or record the content for later viewing as desired. However, in the embodiment of FIG. 20, the EPG is provided by the primary provider to indicate to the viewer the programming schedule of various networks and not necessarily to availability of the video content. Consequently, while the Nova show "Mystery of a Masterpiece" is scheduled for broadcast on PBS from 8-9 PM, the primary provider does provide that content to the viewer by acquiring it from PBS during such a broadcast. Rather, the content is simply content that may or may not exist in the primary provider's data stores. If it does currently exist, then it is available immediately. In this case, the episode in question is a repeat as indicated by the R designation next to the watch now indicator. Therefore, the episode is immediately available. That the episode appears in the EPG as being scheduled for broadcast beginning at 8:00 PM is happenstance.

While the NOVA episode is a repeat, the Suburgatory episode is not a repeat. The question may then arise as to how an episode that has not yet been broadcast be immediately available for viewing. The answer lies in the record everything all the time design of the primary provider system. The Suburgatory episode is scheduled for broadcast beginning at 8:30 PM in a given time zone. However, in the present case, the episode has already aired in an earlier time zone. The content already resides in the primary provider's data stores and is immediately available for viewing. It is noted that in some cases agreements may be in place which prevent such "early viewing" of an episode. Such agreements may require that live broadcast episodes such as these be viewable during their "proper" time slots. Nevertheless, the systems described herein are fully capable of providing such early viewing and identifying such episodes in an EPG. Also shown in FIG. 20 is a selectable element 2040 that enables the viewer to subscribe to the Law & Order show (i.e., it is not currently subscribed). Selecting element 2040 may then present the viewer with options for subscribing to the series, purchasing a single episode, or otherwise. When selecting a particular series or episode (or any other content) for a subscription, as noted above there may be many sources available for the content. For example, numerous providers may be available for episodes of Law & Order. In such cases, the viewer may select from the available options to complete the subscription. In various embodiments, the various options may be prioritized or otherwise filtered for presentation to the viewer. Factors that go in to such prioritization and/or filtering will be discussed in relation to FIGS. 23 and 24.

Figure 21:
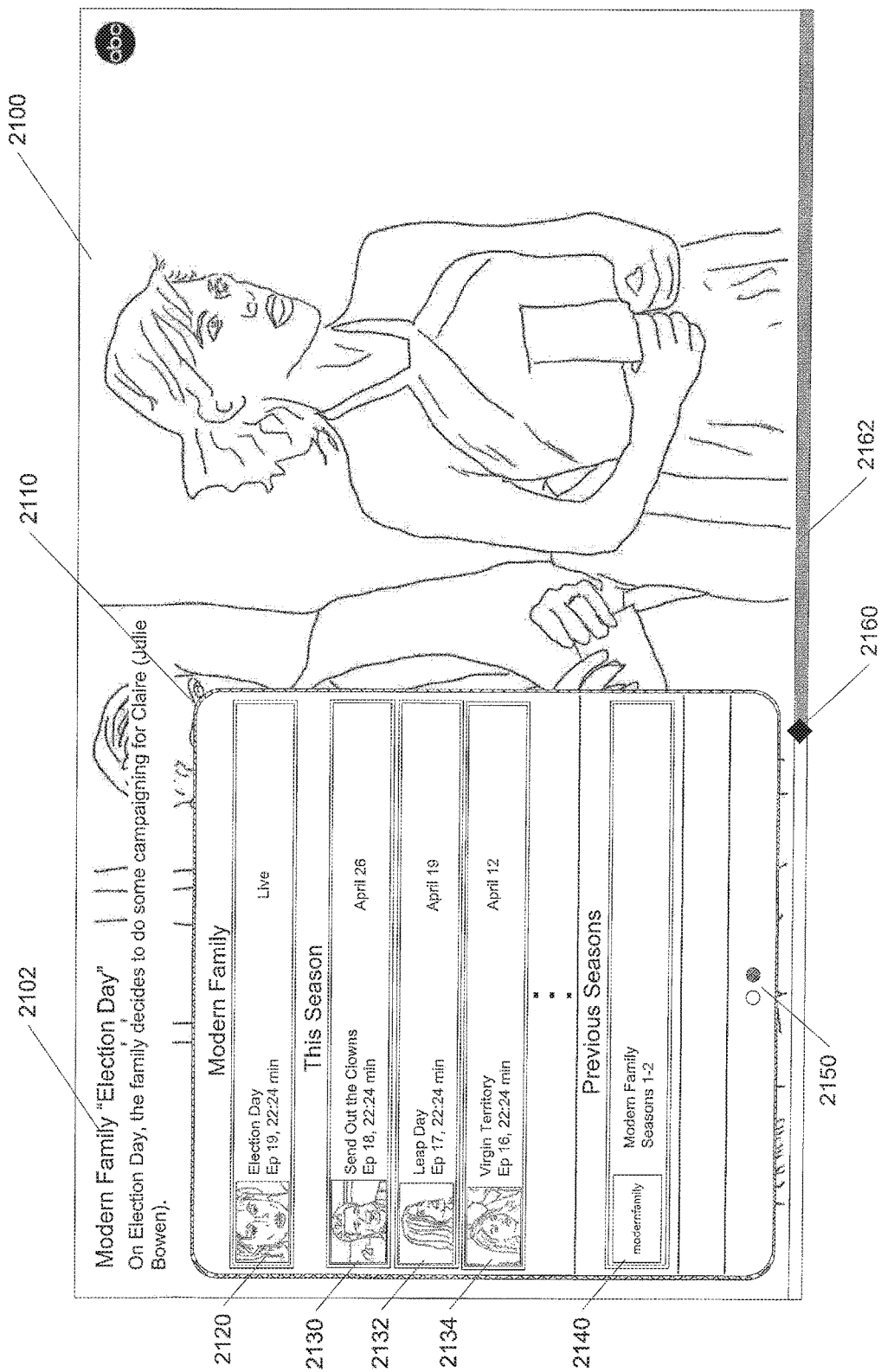
FIG. 21 depicts one embodiment of a video display.
Figure 22:
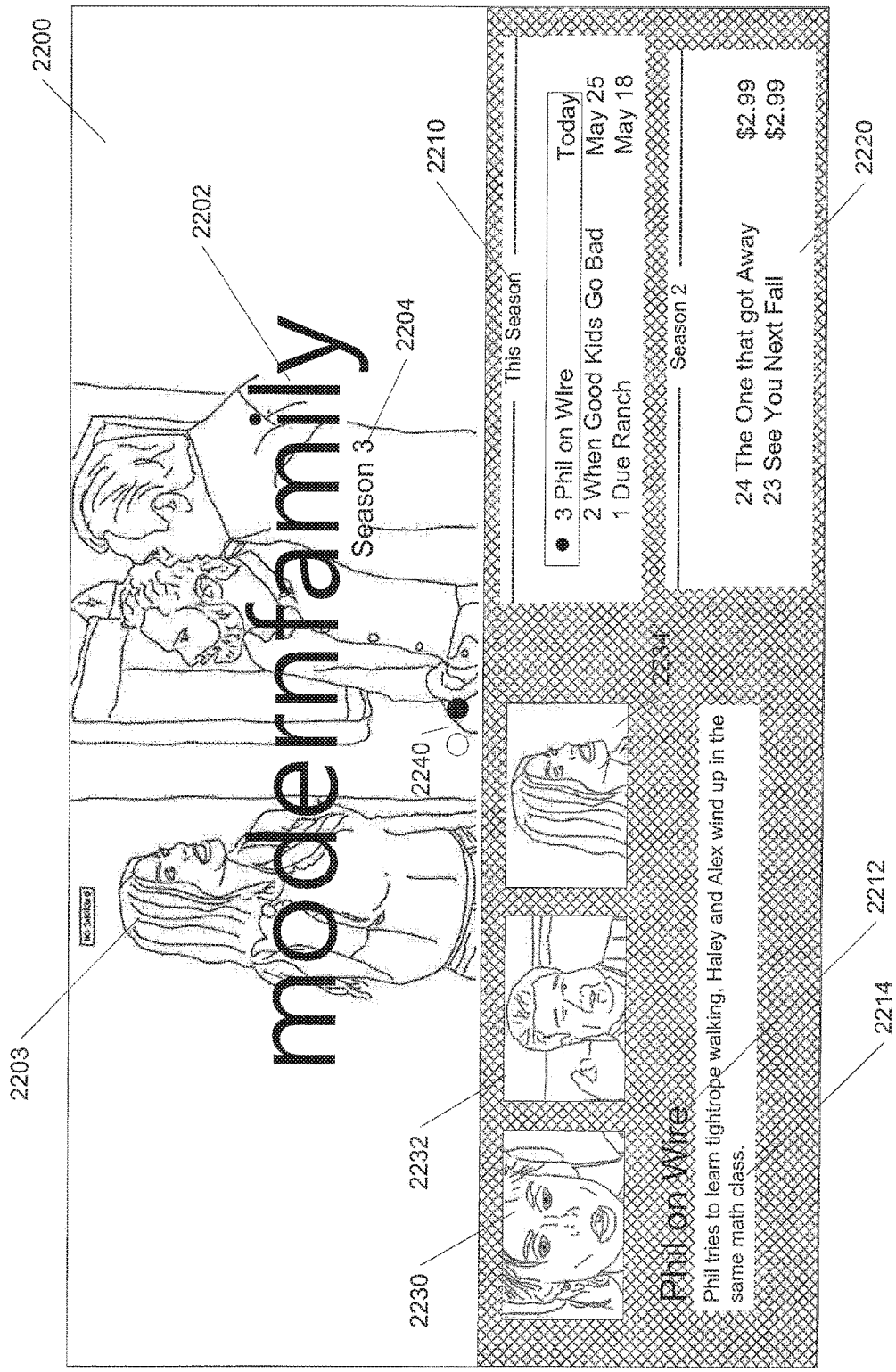
FIG. 22 depicts one embodiment of a video display.

FIGS. 21 and 22 illustrate various embodiments for the presentation of available content by the primary provider. FIG. 21 depicts a video display 2100 with scrubber bar 2162 at the bottom portion of the display. In this example, information corresponding to the currently displayed video content is provided. The video content in this case is an episode from the Modern Family television series. An icon of the television network is depicted in the upper right corner of the display. A brief description 2102 of the episode is provided, and an overlay window 2110 is provided with information regarding seasons and episodes for the Modern Family series. In various embodiments, the information 2110 may be accessed directly while watching the episode currently displayed. In the example shown, the currently displayed is identified as element 2120 in the display area 2110. This element includes an image corresponding to the episode, title of the episode (Election Day), indication of the episode number (19) within the season, run time of the episode (22:24 min), and air date of the episode ("Live").

A second portion of the display area 2110 identifies other episodes 2130, 2132, and 2134 in the current season. Each including information similar to that in the description of element 2120. A further portion of the display area 2110 includes an element 2140 identifying further seasons of available content for the Modern Family television series. In various embodiments, each of the elements within the display area 2110 are selectable with a remote control to navigate to related content. For example, selecting element 2134 may begin immediate presentation of the corresponding episode or may navigate to a page with further information corresponding to that episode. Selection of element 2140 will navigate to elements with more detailed information regarding seasons 1 and 2 of the television series where a particular episode may be selected for viewing. In the example shown, indicators 2150 may be used to indicate further pages are available for viewing. For example, two dots may indicate there are two pages available in the current context. A lighter dot may indicate the current page with a darker dot indicating another, or vice-versa. Numerous alternative approaches to indicating the availability of further content are available and are contemplated. While the content being currently displayed 2100 may represent live broadcast television, the systems described herein have been continually amassing large quantities of video content. Consequently, all prior content related to the currently displayed television series is immediately available to the primary providers subscribers.

FIG. 22 provides one more example regarding the presentation of available content. In this example, the display 2200 is of a landing page for the television series Modern Family. Such a landing page may serve as a launching point for exploring the television show. In this example, video, still, or animation content 2203 related to the show is provided. Also included is the series title 2202 and indication of a particular season 2204 of the television series. Page indicators 2240 may also be included. The lower portion of the display provides details regarding episodes of the television series. The right portion of the lower display depicts episodes for the current season 2210 and episodes for prior seasons 2220. The uppermost episode ("3 Phil on Wire") in the current season 2210 has focus. In this case, focus is indicated by a box surrounding the entry and a bullet preceding the entry. Such techniques for illustrating focus are exemplary only. Having this episode ("3") in focus causes the display of information related to the selected episode in the left portion of the lower display. For example, a title 2212 for the episode and brief description 2214 of the episode are provided. In addition, images 2230, 2232, 2234 from the episode are provided.

In the example of FIG. 22, episodes from season 2 2220 are available for viewing for a fee ($2.99). Based on the viewer's subscriptions, these episodes are not available for free. The content is available from and will be provided by the primary provider should it be purchased. Should the viewer select one of these episodes, navigation to a purchase screen may be provided similar to that discussed in relation to FIG. 19. The purchase could be made directly from the primary provider. Alternatively, In the event there are multiple other providers available for a given episode, the viewer may be given a choice as to which to purchase the episode from. Purchasing the episode from a secondary provider does not mean the episode will be provided by the secondary provider. Rather, such a purchase simply provides the viewer access to that episode from the primary provider.

Figure 23:
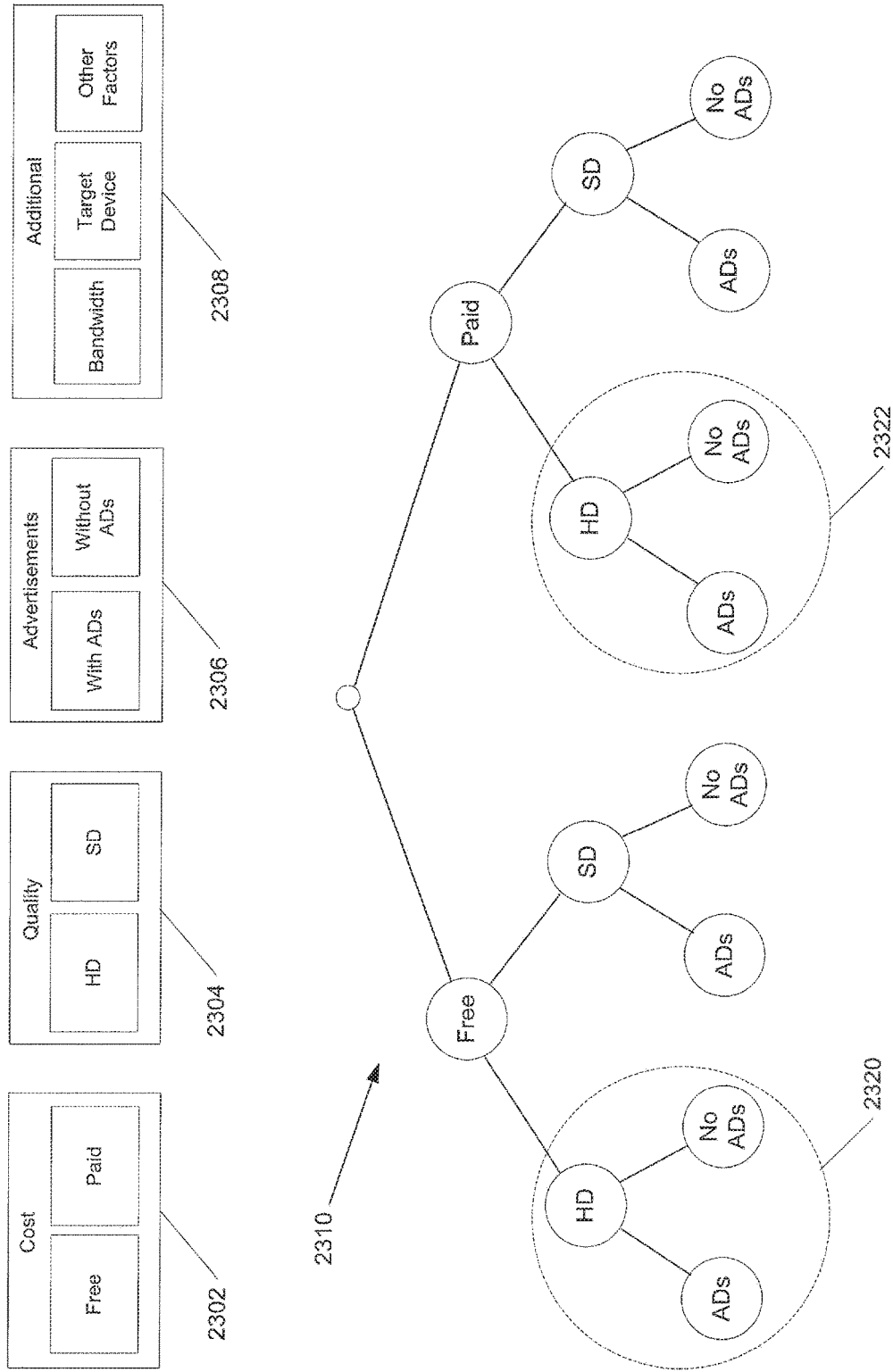
FIG. 23 depicts one embodiment of content selection biasing factors.

As discussed above, the primary provider will generally have a great deal of content available for viewing by a given subscriber. The content that is available may be determined in part based on secondary subscriptions of the viewer. As noted, there may be duplication among the secondary subscriptions and/or primary subscription as to available content. Additionally, particular content may be available in many forms. FIG. 23 illustrates some of the various forms that content may take.

In the example shown, content may differ as to cost 1602 (viewable for free or viewable for payment of a fee) and quality (e.g. High Definition or HD or Standard Definition, or SD) 1604. In addition, presentation of content may include presentation with advertisements (ADs) or without ADs 1606. With only these variables, given content may correspond to one of eight different forms/presentations as shown by the tree 1610, though it should be understood that additional higher or lower levels of quality such as "4K" or different levels of HD (such as 720p, 1080i etc.) can optionally be supported by the system. In this case, the eight possibilities are:

1. Free, HD, with ADs
2. Free, HD, without ADs
3. Free, SD, with ADs
4. Free, SD, without ADs
5. Paid, HD, with ADs
6. Paid, HD, without ADs
7. Paid, SD, with ADs
8. Paid, SD, without ADs Given these possibilities, a viewer may have various preferences regarding how the given content is prioritized when either being presented as being available or when being selected for viewing. For example, a viewer may give a higher priority to free content over paid content. Also, HD content may be given priority over SD content, and so on. Using such preferences, selections from available content may be made for presentation to the viewer or when particular content is selected for viewing. In addition to such preferences, additional factors 2308 may be used to determine which content is provided to a viewer. For example, bandwidth considerations may affect the selection of content. If it is determined that the bandwidth to the viewer's device is limited, HD content may be disfavored (at least temporarily) until the condition eases. In such a case, the options indicated by 2320 and 2322 in FIG. 23 may be eliminated. Additionally, a viewer's preferences may generally indicate a preference for HD content. However, on a particular occasion, the viewer's target device may have a very small display, which may not generally reveal significant differences between SD and HD content. In such a case, SD may be preferentially conveyed.

Figure 24:
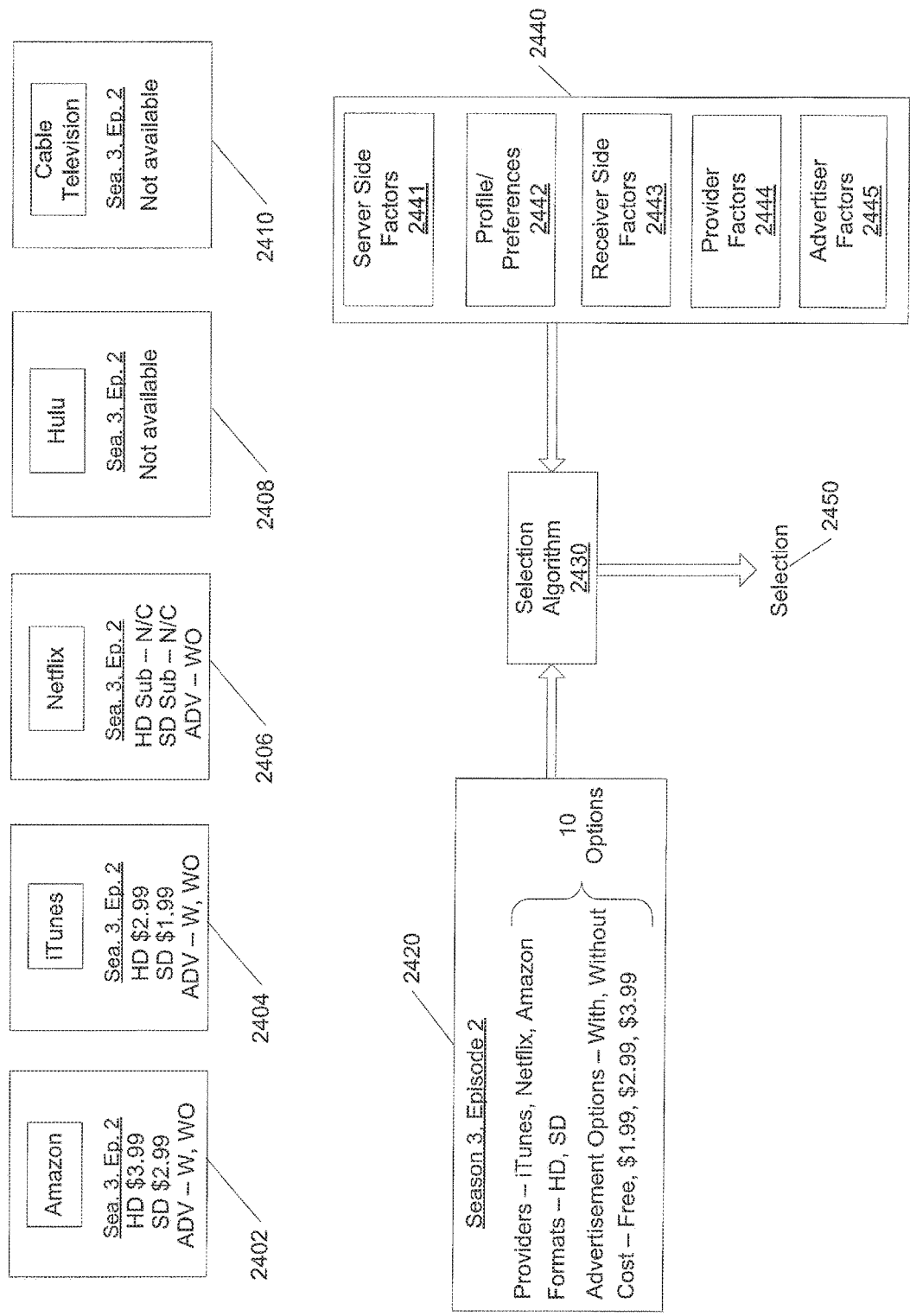
FIG. 24 depicts one embodiment of content selection biasing factors.

FIG. 24 depicts one embodiment in which multiple options for content are available. In the example shown, five secondary providers 2402, 2404, 2406, 2408 and 2410 are shown. The particular content in question is Season 3, Episode 2 of a given series. For this given episode, box 2420 shows there are 10 different selections available. There are three secondary providers of the particular content available—iTunes, Netflix, and Amazon. The content is available in both HD and SD. The content is available for free (Netflix subscription—no additional charge N/C), at a cost of $1.99, $2.99, and $3.99. Finally, the content is available with or without advertisements. All 10 options serve as input to a selection algorithm 2430. Also serving as input to the selection algorithm are server side factors 2441, viewer profile/preferences 2442, receiver side factors 2443, provider factors 2444, and advertiser factors 2445 (collectively factors 2440). Viewer profile/preferences 2442 may include information based on a viewer's viewing habits and activities, explicitly entered viewer preferences or information, profile and/or preference information related to other viewers, or any combination of these. Such profile and/or preference information may generally be referred to as a viewer "profile" herein. Server side factors 2441 may include processing and bandwidth considerations. Profile/Preferences 2442 have been discussed. Receiver side factors 2443 may include information received from a target device regarding processing, memory, or other condition that may affect performance. Provider factors 2444 may include agreements with secondary providers regarding how content is to be provided. Finally, advertiser factors 2445 may include agreements with advertisers how advertisements are to be presented. As may be appreciated, many other factors are possible and are contemplated. It is noted that while the term server is used herein, the term in not limited to client-server architectures in the strict sense. Rather, the term server may generally refer to any source of content.

Given the available content options and factors 2440, the algorithm 2430 selects one or more of the options for presentation to the viewer. Such a process may be repeated as need to generate a plurality of items for presentation to a viewer (e.g., a number of episodes of a given series).

Figure 25:
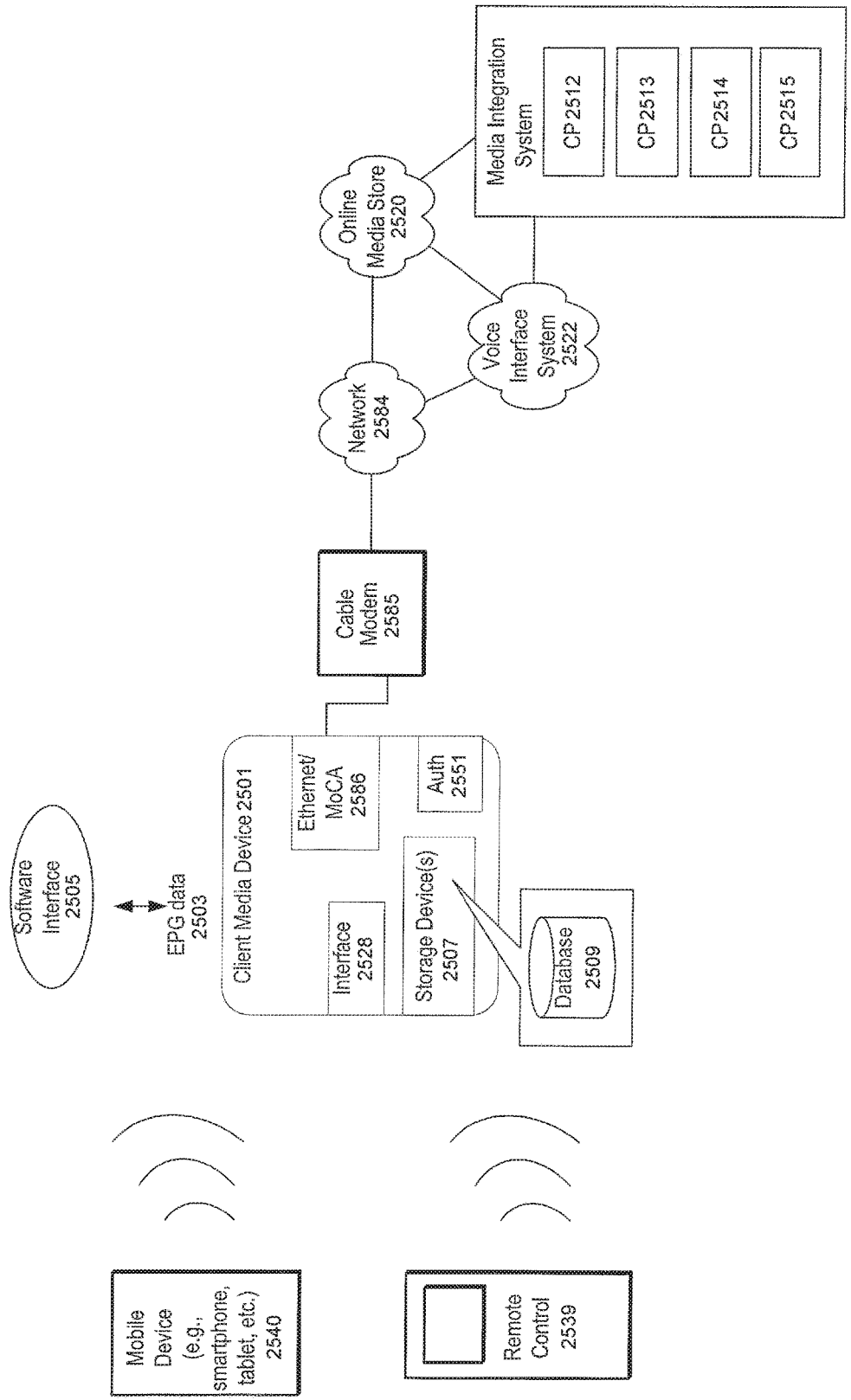
FIG. 25 depicts one embodiment of media content delivery system.

FIG. 25 illustrates a system including a client media device 2501 configured to receive media content via a network 2584. The client media device may provide the media content to one or more display devices, audio devices, or other devices enabling a user of the client device to view, hear, or otherwise use the media content.

The client media device 2501 may communicate with an online media store 2520 through the network 2584 to receive information for displaying a user interface showing various media content available for delivery to the client media device. Each piece of media content may be referred to as a "media production." Examples of media productions include various kinds of movies and films, television programs, music videos, albums/songs, etc. In general, a given media production may include any kind of content that includes video and/or audio information.

In some embodiments the online media store may be coupled to or may include a media integration system 2510 which integrates media productions from a plurality of third-party content provider systems, such as the content providers CP 2512-2515. Each of the content provider systems may be managed by or affiliated with any kind of company or organization, such as cable or satellite television providers, television networks or channels, movie studios, sporting leagues, news organizations, music labels, online media services, etc. Thus, the user interface displayed by the client media device may aggregate the media productions available from many different content providers or sources, and may provide a convenient way for the user to see the content from different providers in an integrated view.

In various embodiments the client media device may communicate with the online media store 2520 through any kind of network 2584. The network 2584 may include any type of network or combination of networks. For example, the network 2584 may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks.

In the illustrated embodiment the client media device is coupled to the network 2584 via Ethernet hardware or Multimedia over Coax Alliance (MoCA) hardware 2586, which in turn couples to a cable modem 2585. In other embodiments the client media device may be coupled to the network 2584 via any other type of wired or wireless connection medium or device. For example, wired mediums may include Ethernet, fiber channel, a modem, etc. Wireless connection mediums may include a wireless connection using a wireless communication protocol such as IEEE 802.11 (wireless Ethernet), a modem link through a cellular service, a satellite link, etc.

The client media device may include one or more storage devices 2507 configured to store data. At least one of the storage devices 2507 may include non-volatile memory configured to persistently store data. In various embodiments the storage device(s) may include one or more disk drives, solid state drives, flash memory devices, optical storage devices, or any other kinds of devices for storing data. In some embodiments the storage device(s) may also include various kinds of volatile memory, such as random access memory (RAM), e.g., synchronous dynamic RAM (SDRAM), static RAM (SRAM), etc.

Electronic Programming Guide (EPG) data 2503 may be periodically delivered to the client media device 2501 via a software interface 2505. The software interface 2505 may include any kind of programming interface or messaging interface that enables the client media device to communicate with an external system to receive the EPG data 2503 or other data. As one example, the software interface 2505 may include a JavaScript Object Notation (JSON) interface. As another example, the software interface 2505 may include a URL-based interface that enables the client media device to perform various functions or exchange information by referencing uniform resource locators (URLs) with particular parameters embedded in them.

The client media device may store the EPG data 2503 on the storage device(s) 2507. For example, one or more databases 2509 may be stored on the storage device 2507, and the EPG data 2503 may be stored in one or more of the databases. The EPG data 2503 may include information about television programming, such as the listing of programs, their scheduled times, the channel lineup, images associated with the programs, etc. The EPG data 2503 may be customized for the particular user of the client media device 2501. For example, if the user subscribes to some subscription-based content providers, but not others, then the EPG data 2503 may include information for only the programs or media productions offered by the providers to which the user subscribes.

The database(s) 2509 may also store other information, such as personalization information for the user(s) of the client media device 2501. The personalization information may include the user's favorite programs or channels, list of recently viewed content, stored play positions for various media content, watch lists, bookmarks, etc.

The client media device may be configured to receive user input from a remote control device 2539 via an interface 2528. The remote control device may use infrared communication, Bluetooth communication, or any of various other kinds of wireless or wired communication techniques to transmit signals to the client media device indicating the user input.

In some embodiments the client media device may be configured to communicate with the media integration system 2510 and/or the online media store 2520 through a voice interface system 2522. For example, in some embodiments the remote control device or the client media device may include a microphone device 2524 that receives speech from the user, e.g., where the speech includes commands, requests, questions, etc. The client media device may convert the speech into digital packets for transmission over the network 84 to the voice interface system 2522. The voice interface system may perform speech recognition to recognize the user's commands or questions. The voice interface system may communicate with the online media store 2520 and/or the media integration system 2510 to pass the user's commands or questions on to them via an interface. The online media store 2520 and/or the media integration system 2510 may then generate information in response to the user's commands or questions and return it to the client media device (or return it to the voice interface system, which may then forward it to the client media device). For example, the user may request to lookup a television program having a certain title or actor, and the system may return information that the client media device uses to display a list of programs matching the title or actor.

In various embodiments the information transmitted from the online media store or voice interface system to the client media device may include any kind of information useable by the client media device to display information regarding the media content available for delivery to the client media device. For example, in some embodiments the system may utilize Extensible Markup Language (XML) code or other markup language code which describes the information to be displayed. The client media device may parse the XML code and display a user interface based on the described information. In some embodiments the system may also transmit graphics files or video feeds which the client media device may incorporate into the user interface.

In some embodiments the client media device may also communicate with a mobile computing device 2540, e.g., where the user may hold the mobile device. For example, the mobile device 2540 may be a handheld computing device, wearable computing device, or other portable computing device. Examples of mobile devices include smartphones, tablet computers, personal digital assistants, portable music players, handheld game devices, wearable computers (e.g., glasses watches), etc. In some embodiments the user may control the client media device 2501 using the mobile device 2540, e.g., using the mobile device 2540 as a remote control. In some embodiments the client media device may also forward the media content received from the online media store 2520 or media integration system 2510 to the mobile device 2540, e.g., so that it can be displayed on a display device included in the mobile device 2540. In other embodiments the mobile device 2540 may communicate directly with the online media store 2520 and/or the media integration system 2510, e.g., without going through the client media device 2501 as an intermediate. The client media device may also be included as a component within the mobile device in some embodiments, and/or the mobile device may be configured to perform the functions described with reference to the client media device.

The client media device may be configured to utilize digital rights management (DRM) techniques to ensure that the user is authorized to receive and view selected media content. For example, the client media device may include an authorization module 2551 configured to communicate with one or more remote servers to implement the digital rights management for the media content. In various embodiments the client media device may communicate with servers associated with any of various systems or organizations in order to implement the digital rights management, such as one or more servers in the online media store 2520 or the content provider systems whose media productions are integrated by the media integration system 2510.

In various embodiments, program instructions of a software application may be used to implement the methods and/or mechanisms previously described. The program instructions may be stored on a computer readable storage medium. Numerous types of storage media are available. The storage medium may be accessible by a computer or other processing device during use to provide the program instructions and accompanying data to the computer or device for program execution.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:
at an electronic device in communication with a display and one or more input devices:
receiving, via the one or more input devices, an input corresponding to a request to view information for a first collection of episodic content; and
in response to receiving the input, displaying, on the display, a user interface corresponding to the first collection of episodic content, wherein the user interface comprises:
a plurality of representations corresponding to a plurality of episodes of a first season of the first collection of episodic content, including:
a first representation corresponding to a first episode of the first season, the first episode available for viewing on the electronic device via a first media source; and
a second representation corresponding to a second episode, different from the first episode, of the first season, the second episode available for viewing on the electronic device via a second media source, different from the first media source.

2. The method of claim 1, wherein:
the user interface corresponding to the first collection of episodic content is displayed without a visual indication that the first and second episodes are available via different media sources.

3. The method of claim 1, further comprising:
receiving an input corresponding to a request to play a respective episode of the first collection of episodic content; and
in response to receiving the input corresponding to the request to play the respective episode of the first collection of episodic content, displaying, on the display, the respective episode of the first collection of episodic content, wherein:
in accordance with a determination that the respective episode is the first episode, displaying the respective episode comprises accessing, by the electronic device, the first episode from the first media source; and
in accordance with a determination that the respective episode is the second episode, displaying the respective episode comprises accessing, by the electronic device, the first episode from the second media source.

4. The method of claim 1, wherein:
the plurality of episodes of the first season of the first collection of episodic content include one or more episodes to which a user of the electronic device has access and one or more episodes to which the user of the electronic device does not have access.

5. The method of claim 4, wherein:
the one or more episodes to which the user of the electronic device has access are available via a secondary provider, different from a primary provider, wherein the availability via the secondary provider is based on the user's subscription with the primary provider.

6. The method of claim 4, wherein:
the one or more episodes to which the user of the electronic device has access are available via a secondary provider, different from a primary provider, wherein the availability via the secondary provider is based on the user's subscription with the secondary provider and is not based on the user's subscription with the primary provider.

7. The method of claim 4, further comprising:
in response to receiving an input corresponding to a request to display a respective episode of the one or more episodes to which the user of the electronic device does not have access, displaying, on the display, an option to subscribe to a secondary provider to gain access to the respective episode via the secondary provider.

8. The method of claim 1, further comprising:
while displaying the user interface, receiving, via the one or more input devices, a second input corresponding to a request to display a plurality of representations corresponding to a plurality of episodes of a second season of the first collection of episodic content, different than the first season; and
in response to receiving the second input, updating the user interface to display the plurality of episodes of the second season of the first collection of episodic content.

9. The method of claim 1, further comprising:
while displaying the user interface, receiving, via the one or more input devices, a second input corresponding to a request to display information about a cast associated with the first collection of episodic content;
in response to receiving the third input, updating the user interface to display the information about the cast associated with the first collection of episode content;
while displaying the user interface, receiving, via the one or more input devices, a third input corresponding to a request to display content related to the first collection of episodic content; and
in response to receiving the fourth input, updating the user interface to display content related to the first collection of episodic content.

10. An electronic device, comprising:
one or more processors;
memory; and
one or more programs, wherein the one or more programs are stored in the memory and configured to be executed by the one or more processors, the one or more programs including instructions for:
receiving, via one or more input devices, an input corresponding to a request to view information for a first collection of episodic content; and
in response to receiving the input, displaying, on the display, a user interface corresponding to the first collection of episodic content, wherein the user interface comprises:
a plurality of representations corresponding to a plurality of episodes of a first season of the first collection of episodic content, including:
a first representation corresponding to a first episode of the first season, the first episode available for viewing on the electronic device via a first media source; and
a second representation corresponding to a second episode, different from the first episode, of the first season, the second episode available for viewing on the electronic device via a second media source, different from the first media source.

11. The electronic device of claim 10, wherein:
the user interface corresponding to the first collection of episodic content is displayed without a visual indication that the first and second episodes are available via different media sources.

12. The electronic device of claim 10, wherein the one or more programs further include instructions for:
receiving an input corresponding to a request to play a respective episode of the first collection of episodic content; and
in response to receiving the input corresponding to the request to play the respective episode of the first collection of episodic content, displaying, on the display, the respective episode of the first collection of episodic content, wherein:
in accordance with a determination that the respective episode is the first episode, displaying the respective episode comprises accessing, by the electronic device, the first episode from the first media source; and
in accordance with a determination that the respective episode is the second episode, displaying the respective episode comprises accessing, by the electronic device, the first episode from the second media source.

13. The electronic device of claim 10, wherein:
the plurality of episodes of the first season of the first collection of episodic content include one or more episodes to which a user of the electronic device has access and one or more episodes to which the user of the electronic device does not have access.

14. The electronic device of claim 13, wherein:
the one or more episodes to which the user of the electronic device has access are available via a secondary provider, different from a primary provider, wherein the availability via the secondary provider is based on the user's subscription with the primary provider.

15. The electronic device of claim 13, wherein:
the one or more episodes to which the user of the electronic device has access are available via a secondary provider, different from a primary provider, wherein the availability via the secondary provider is based on the user's subscription with the secondary provider and is not based on the user's subscription with the primary provider.

16. The electronic device of claim 13, wherein the one or more programs further include instructions for:
in response to receiving an input corresponding to a request to display a respective episode of the one or more episodes to which the user of the electronic device does not have access, displaying, on the display, an option to subscribe to a secondary provider to gain access to the respective episode via the secondary provider.

17. The electronic device of claim 10, wherein the one or more programs further include instructions for:
while displaying the user interface, receiving, via the one or more input devices, a second input corresponding to a request to display a plurality of representations corresponding to a plurality of episodes of a second season of the first collection of episodic content, different than the first season; and
in response to receiving the second input, updating the user interface to display the plurality of episodes of the second season of the first collection of episodic content.

18. The electronic device of claim 10, wherein the one or more programs further include instructions for:
while displaying the user interface, receiving, via the one or more input devices, a second input corresponding to a request to display information about a cast associated with the first collection of episodic content;
in response to receiving the third input, updating the user interface to display the information about the cast associated with the first collection of episode content;
while displaying the user interface, receiving, via the one or more input devices, a third input corresponding to a request to display content related to the first collection of episodic content; and
in response to receiving the fourth input, updating the user interface to display content related to the first collection of episodic content.

19. A non-transitory computer readable storage medium storing one or more programs, the one or more programs comprising instructions, which when executed by one or more processors of an electronic device, cause the electronic device to perform a method comprising:
receiving, via one or more input devices, an input corresponding to a request to view information for a first collection of episodic content; and
in response to receiving the input, displaying, on the display, a user interface corresponding to the first collection of episodic content, wherein the user interface comprises:
a plurality of representations corresponding to a plurality of episodes of a first season of the first collection of episodic content, including:
a first representation corresponding to a first episode of the first season, the first episode available for viewing on the electronic device via a first media source; and
a second representation corresponding to a second episode, different from the first episode, of the first season, the second episode available for viewing on the electronic device via a second media source, different from the first media source.

20. The non-transitory computer readable storage medium of claim 19, wherein:
the user interface corresponding to the first collection of episodic content is displayed without a visual indication that the first and second episodes are available via different media sources.

21. The non-transitory computer readable storage medium of claim 19, the method further comprising:
receiving an input corresponding to a request to play a respective episode of the first collection of episodic content; and
in response to receiving the input corresponding to the request to play the respective episode of the first collection of episodic content, displaying, on the display, the respective episode of the first collection of episodic content, wherein:
in accordance with a determination that the respective episode is the first episode, displaying the respective episode comprises accessing, by the electronic device, the first episode from the first media source; and
in accordance with a determination that the respective episode is the second episode, displaying the respective episode comprises accessing, by the electronic device, the first episode from the second media source.

22. The non-transitory computer readable storage medium of claim 19, wherein:
the plurality of episodes of the first season of the first collection of episodic content include one or more episodes to which a user of the electronic device has access and one or more episodes to which the user of the electronic device does not have access.

23. The non-transitory computer readable storage medium of claim 22, wherein:
the one or more episodes to which the user of the electronic device has access are available via a secondary provider, different from a primary provider, wherein the availability via the secondary provider is based on the user's subscription with the primary provider.

24. The non-transitory computer readable storage medium of claim 22, wherein:
the one or more episodes to which the user of the electronic device has access are available via a secondary provider, different from a primary provider, wherein the availability via the secondary provider is based on the user's subscription with the secondary provider and is not based on the user's subscription with the primary provider.

25. The non-transitory computer readable storage medium of claim 22, the method further comprising:
in response to receiving an input corresponding to a request to display a respective episode of the one or more episodes to which the user of the electronic device does not have access, displaying, on the display, an option to subscribe to a secondary provider to gain access to the respective episode via the secondary provider.

26. The non-transitory computer readable storage medium of claim 19, the method further comprising:
while displaying the user interface, receiving, via the one or more input devices, a second input corresponding to a request to display a plurality of representations corresponding to a plurality of episodes of a second season of the first collection of episodic content, different than the first season; and
in response to receiving the second input, updating the user interface to display the plurality of episodes of the second season of the first collection of episodic content.

27. The non-transitory computer readable storage medium of claim 19, the method further comprising:
while displaying the user interface, receiving, via the one or more input devices, a second input corresponding to a request to display information about a cast associated with the first collection of episodic content;
in response to receiving the third input, updating the user interface to display the information about the cast associated with the first collection of episode content;
while displaying the user interface, receiving, via the one or more input devices, a third input corresponding to a request to display content related to the first collection of episodic content; and
in response to receiving the fourth input, updating the user interface to display content related to the first collection of episodic content.

* * * * *